United States Patent
Alamouti et al.

(10) Patent No.: US 7,095,708 B1
(45) Date of Patent: Aug. 22, 2006

(54) METHODS AND APPARATUS FOR USE IN COMMUNICATING VOICE AND HIGH SPEED DATA IN A WIRELESS COMMUNICATION SYSTEM

(75) Inventors: Siavash Alamouti, Seattle, WA (US); Jeffrey Battin, Duvall, WA (US); David B. Gibbons, Redmond, WA (US); James Timothy Golden, Carnation, WA (US); Michael R. Hirano, Redmond, WA (US); Elliott Hoole, Redmond, WA (US); Mary Jesse, Issaquah, WA (US); Robert Lee Maxwell, Duvall, WA (US); Steven E. McMeekin, Nederland, CO (US); David J. Nix, Austin, TX (US); David James Ryan, Oakland, CA (US); Gregory J. Veintimilla, Redmond, WA (US); Hongliang Zhang, Bellevue, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 1327 days.

(21) Appl. No.: 09/594,467

(22) Filed: Jun. 14, 2000
(Under 37 CFR 1.47)

Related U.S. Application Data

(60) Provisional application No. 60/140,649, filed on Jun. 23, 1999.

(51) Int. Cl.
*H04J 11/00* (2006.01)

(52) U.S. Cl. .................................. 370/208; 370/210

(58) Field of Classification Search ................ 370/208, 370/210, 294, 328, 330, 352, 347, 389; 708/404; 714/784; 375/298; 704/200, 219, 203, 204
See application file for complete search history.

(56) References Cited

U.S. PATENT DOCUMENTS

| 5,282,222 | A | 1/1994 | Fattouche et al. ............. 375/1 |
| 5,416,801 | A | 5/1995 | Chouly et al. .............. 375/260 |
| 5,463,629 | A | 10/1995 | Ko |
| 5,521,943 | A | 5/1996 | Dambacher et al. ........ 375/295 |
| 5,592,470 | A | 1/1997 | Rudrapatna et al. ........ 370/320 |

(Continued)

FOREIGN PATENT DOCUMENTS

EP    0599632 A2    6/1994

(Continued)

OTHER PUBLICATIONS

PCT, Internation Search Report for PCT/US00/16700.

(Continued)

*Primary Examiner*—Duc Ho

(57) ABSTRACT

A fixed wireless system (FWS) utilizing Orthogonal Frequency Division Multiplexing (OFDM) communication techniques is spectrally efficient and responsive to communications involving both voice and high speed data, such as Internet data. The FWS includes a wireless base unit; a plurality of fixed wireless remote units; a plurality of wireless data traffic channels available between the wireless base unit and the plurality of fixed wireless remote units; and a plurality of wireless voice traffic channels available between the wireless base unit and the plurality of fixed wireless remote units. Each wireless traffic channel is identifiable by a unique combination of frequency and time slots. Each wireless data traffic channel is used for carrying high speed data in addressed data packets to and from the plurality of fixed wireless remote units. On the other hand, each wireless voice traffic channel can be assigned and dedicated to a particular voice communication call involving one of the plurality of fixed wireless remote units for carrying voice data of the call.

24 Claims, 25 Drawing Sheets

U.S. PATENT DOCUMENTS

| | | | |
|---|---|---|---|
| 5,673,322 A | 9/1997 | Pepe et al. | |
| 5,771,224 A | 6/1998 | Seki et al. | 370/206 |
| 5,815,488 A | 9/1998 | Williams et al. | |
| 5,889,759 A * | 3/1999 | McGibney | 370/207 |
| 5,933,421 A | 8/1999 | Alamouti et al. | |
| 5,933,478 A | 8/1999 | Ozaki et al. | |
| 6,385,190 B1 * | 5/2002 | Malkamaki et al. | 370/347 |
| 6,496,490 B1 * | 12/2002 | Andrews et al. | 370/329 |

FOREIGN PATENT DOCUMENTS

| | | | |
|---|---|---|---|
| EP | 0667695 | A1 | 8/1995 |
| EP | 0841762 | A2 | 5/1998 |
| EP | 0890943 | A2 | 1/1999 |
| EP | 1005190 | A2 | 5/2000 |
| WO | WO 95/12261 | | 5/1995 |
| WO | WO 96/21302 | | 7/1996 |
| WO | WO 98/35463 | | 8/1998 |

OTHER PUBLICATIONS

Cimini, Jr., Leonard J. et al., "OFDM with Diversity and Coding for Advanced Cellular Internet Services," IEEE, Mar. 11, 1997, pp. 305-309.

Chuang, J. C-I, "An OFDM-based System with Dynamic Packet Assignment and Interference Suppression for Advanced Cellular Internet Service," IEEE, Aug. 11, 1998, pp. 974-979.

International Preliminary Examination Report and Notification Transmittal from PCT/US00/16700, dated Mar. 25, 2002.

* cited by examiner

METHODS AND APPARATUS FOR USE IN COMMUNICATING VOICE AND HIGH SPEED DATA IN A WIRELESS COMMUNICATION SYSTEM

RELATED APPLICATION

This application claims the benefit of U.S. Provisional Application No. 60/140,649, filed Jun. 23, 1999 and entitled "Method for Voiceband Communication in a Personal Wireless Network," which is incorporated herein in its entirety.

BACKGROUND OF THE INVENTION

1. Field of the Invention

This present invention relates generally to wireless communication systems, and more particularly to wireless communication systems utilizing Orthogonal Frequency Division Multiplexing (OFDM) techniques.

2. Description of the Related Art

In conventional telephone systems, voice communication between users is realized using a dedicated physical channel in a "circuit-switched" network. In wireless communication systems, such as analog cellular telephone systems, voice communication is similarly realized with the use of a dedicated frequency channel, for example, with the use of Frequency Division Duplex (FDD) communications. In digital cellular telephone systems, voice communication is similarly realized using a dedicated time slot channel, for example, with the use of Time Division Duplex (TDD) communications.

Movement over the past several years, however, has been in the direction of "packet-switched" communications. Packet-switched communications involve small data packets which carry data and are addressed to particular recipients. The physical channel over which the data packets are sent is shared between multiple users, and therefore multiple data packets from multiple users may adversely affect (i.e., slow down) the transmission of data packets. Packet-switched communications have become popular due to the popularity of the Internet. Wireless communication systems, such as cellular and personal communication systems (PCS), have begun to embrace packet-switched communications so that high speed data, such as data available over the Internet, may be obtained. Even for communications involving voice, packet-switched methods have been advocated with use of, for example, Voice Over IP (VoIP).

Wireless communications systems in particular operate over limited spectral bandwidths. These systems must make highly efficient use of the scarce bandwidth resource to provide good service to a large population of users. Good services require that the system have sufficient capacity and be highly responsive to its user requests. Accordingly, what is needed is a wireless communication system that is spectrally efficient and responsive in communications involving voice and/or high speed data.

SUMMARY OF THE INVENTION

The present invention involves a wireless communication system that is spectrally efficient and responsive to communications involving voice and/or high speed data, such as Internet data. The system preferably utilizes Orthogonal Frequency Division Multiplexing (OFDM) or OFDM-like communication techniques, and defines each one of a plurality of traffic channels by a unique combination of frequency and time slots. The traffic channels may be voice traffic channels or data traffic channels. Each voice traffic channel is assignable to a voice communication call for carrying voice data and remains dedicated to the call, preferably throughout the entire duration of the call. This channel may be referred to as a "circuit-switched" type channel. On the other hand, each data traffic channel is used for carrying high speed data in addressed data packets. This channel may be referred to as a "packet-switched" type channel.

An inventive method of receiving data in a wireless communication system includes the steps of receiving radio frequency (RF) OFDM communication signals over a voice traffic channel that is dedicated to a voice communication call, the voice traffic channel identifiable by a unique frequency/time slot combination; downconverting the RF OFDM communication signals for producing downconverted OFDM communication signals; sampling the downconverted OFDM communication signals for producing OFDM communication signal samples; for each frequency/time slot combination associated with the voice traffic channel: applying a Fast Fourier Transform (FFT) to the OFDM communication signal samples for producing a plurality of modulated tones; and demodulating the plurality of modulated tones for producing voice data of the voice communication call. This method includes the further steps of receiving RF OFDM communication signals over a data traffic channel, the data traffic channel identifiable by a unique frequency/time slot combination; for each frequency/time slot combination associated with the data traffic channel: applying an FFT to the OFDM communication signal samples for producing a plurality of modulated tones; and demodulating the plurality of modulated tones for producing high speed data in addressed data packets.

The step of demodulating the plurality of modulated tones includes producing encoded and compressed data for each one of the plurality of modulated tones. The method includes the further steps of decoding the encoded and compressed data for producing compressed data, and decompressing the compressed data for producing the voice data of the voice communication call. For each addressed data packet, the method includes the further steps of comparing a destination address of the addressed data packet with a predetermined address; accepting the addressed data packet if a match exists between the destination address and the predetermined address; and discarding the addressed data packet if the destination address and the predetermined address do not match.

Similarly, a wireless receiver of the present invention includes a receiver front end, an RF downconverter, an analog-to-digital converter (ADC), an FFT processor, and a demodulator. The receiver front end is operative to receive RF OFDM communication signals over a voice traffic channel that is dedicated to a voice communication call, where the voice traffic channel is identifiable by a unique frequency/time slot combination. The RF downconverter is operative to downconvert the RF OFDM communication signals for producing downconverted OFDM communication signals. The ADC is operative to convert the downconverted OFDM communication signals into OFDM communication signal samples. The FFT processor is operative to apply an FFT to the OFDM communication signal samples for producing a plurality of modulated tones for each frequency/time slot combination associated with the voice traffic channel. The demodulator is operative to demodulate the plurality of modulated tones for each frequency/time slot combination associated with the voice traffic channel for producing voice data of the voice communication call. The receiver front end is further operative to receive RF OFDM communication signals over a data traffic channel, where the data traffic channel identifiable by a unique frequency/time slot combination. The FFT processor is further operative to apply an FFT to the OFDM communication signal samples for producing a plurality of modulated tones for each frequency/time slot combination associated with the data traffic channel. The demodulator is further operative to demodulate the plurality of modulated tones for each frequency/time slot combination associated with the data traffic channel for producing the high speed data in addressed data packets.

The demodulator is further operative for producing encoded and compressed data for each one of the plurality of modulated tones. The wireless receiver further includes a decoder and a decompressor. The decoder is operative to decode the encoded and compressed data for producing compressed data, and the decompressor is operative to decompress the compressed data for producing the voice data. The wireless receiver further includes a processor that is operate to compare a destination address of the addressed data packet with a predetermined address, to accept the addressed data packet if a match exists between the destination address and the predetermined address, and to discard the addressed data packet if the destination address and the predetermined address do not match.

Another inventive method of transmitting data in a wireless communication system includes the steps of, for each frequency/time slot combination associated with a voice traffic channel: modulating a plurality of tones with voice data of a voice communication call that is assigned to the voice traffic channel; applying an Inverse Fast Fourier Transform (IFFT) to the plurality of modulated tones for producing OFDM communication signal samples; and converting the OFDM communication signal samples to OFDM communication signals. This method includes the further steps of upconverting the OFDM communication signals for producing RF OFDM communication signals; and transmitting the RF OFDM communication signals over the voice traffic channel. In addition, the method includes the further steps of, for each frequency/time slot combination associated with a data traffic channel: modulating a plurality of tones with high speed data in addressed data packets; applying an IFFT to the plurality of tones for producing OFDM communication signal samples; and converting the OFDM communication signal samples to OFDM communication signals. This extended method includes the further steps of upconverting the OFDM communication signals for producing RF OFDM communication signals; and transmitting the RF OFDM communication signals over the data traffic channel. The step of modulating includes the further step of modulating a phase and amplitude of each one of the plurality of modulated tones. This method of transmitting includes the further steps of compressing the voice data for producing compressed voice data, and encoding the compressed voice data for producing encoded and compressed voice data.

A wireless transmitter of the present invention includes a modulator, an IFFT, a digital to analog converter (DAC), an RF upconverter, and a transmitter front end. The modulator is operative to modulate a plurality of tones with voice data of a voice communication call for each frequency/time slot combination associated with a voice traffic channel that is assigned to the voice communication call. The IFFT processor is operative to apply an IFFT to the plurality of tones for each frequency/time slot combination associated with the voice traffic channel for producing OFDM communication signal samples. The DAC is operative to convert the OFDM communication signal samples into OFDM communication signals. The RF upconverter is operative to upconvert the OFDM communication signals for producing RF OFDM communication signals. The transmitter front end is operative to transmit the RF OFDM communication signals over the voice traffic channel. The modulator is further operative to modulate a plurality of tones with high speed data for each frequency/time slot combination associated with a data traffic channel, where the high speed data is carried in addressed data packets. The IFFT processor is further operative to apply an IFFT to the plurality of tones for each frequency/time slot combination associated with the data traffic channel for producing OFDM communication signal samples. The transmitter front end is further operative to transmit the RF OFDM communication signals over the data traffic channel. The modulator is a phase and amplitude modulator, and the wireless transmitter further includes a vocoder and a block encoder. The vocoder is operative to compress the voice data for producing compressed voice data, and the block encoder is operative to encode the compressed voice data for producing encoded and compressed voice data.

Steps of another inventive method for communicating data in a wireless OFDM communication system include providing a plurality of wireless voice traffic channels for carrying voice data, and providing a plurality of wireless data traffic channels for carrying high speed data in addressed data packets. Each wireless data and voice traffic channel is identifiable by a unique combination of frequency and time slots. Each wireless voice traffic channel is assignable to a voice communication call for carrying voice data of the voice communication call. Preferably, each wireless voice traffic channel is dedicated to a voice communication call upon being assigned.

Finally, according to another aspect of the present invention, a fixed wireless system utilizing OFDM techniques includes a wireless base unit; a plurality of fixed wireless remote units; a plurality of wireless voice traffic channels assignable between the wireless base unit and the plurality of fixed wireless remote units; and a plurality of wireless data traffic channels assignable between the wireless base unit and the plurality of fixed wireless remote units. Each wireless traffic channel is identifiable by a unique combination of frequency and time slots. Each wireless data traffic channel is used for carrying high speed data in addressed data packets to and from the plurality of fixed wireless remote units. On the other hand, each wireless voice traffic channel is assignable to a voice communication call involving one of the plurality of fixed wireless remote units for carrying voice data of the voice communication call. Preferably, each wireless voice traffic channel is dedicated to a voice communication call upon being assigned.

DETAILED DESCRIPTION OF THE PREFERRED EMBODIMENTS

The present invention involves a wireless communication system that is spectrally efficient and responsive to communications involving voice and/or high speed data, such as Internet data. The system preferably utilizes Orthogonal Frequency Division Multiplexing (OFDM) or OFDM-like communication techniques and defines each one of a plurality of traffic channels by a unique combination of frequency and time slots. The traffic channels may be voice traffic channels or data traffic channels. Each voice traffic channel is assignable to a voice communication call for carrying voice data and remains dedicated to the call, preferably throughout the entire duration of the call. This channel may be referred to as a "circuit-switched" type channel. On the other hand, each data traffic channel is used for carrying high speed data in addressed data packets. This channel facilitates "packet-switched" type communications.

Figure 1:
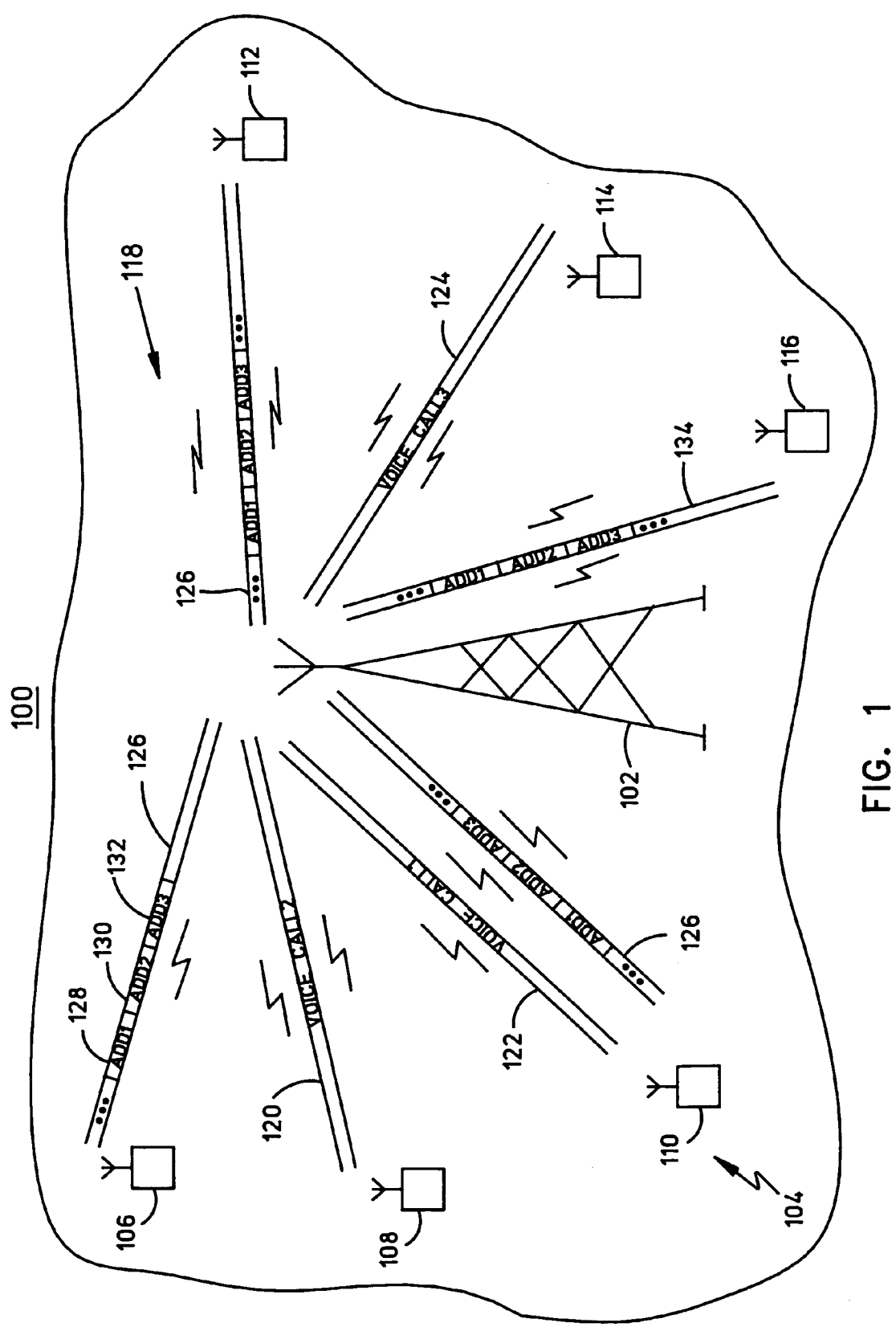
FIG. 1 is an illustration of a wireless communication system which may embody the present invention.

FIG. 1 is an illustrative representation of a wireless communication system 100 that utilizes OFDM communication techniques. Wireless communication system 100 includes at least one wireless base unit 102 and a plurality of wireless remote units 104. Although any suitable number of remote units may exist, the plurality of wireless remote units 104 in FIG. 1 includes wireless remote units 106, 108, 110, 112, 114, and 116. Wireless base unit 102 and the plurality of wireless remote units 104 include, among other things described later, wireless OFDM transceivers to communicate data over an airlink.

The airlink includes a plurality of wireless traffic channels 118. More specifically, wireless communication system 100 includes a plurality of wireless voice traffic channels available between wireless base unit 102 and the plurality of wireless remote units 104, and a plurality of wireless data traffic channels available between wireless base unit 102 and the plurality of wireless remote units 104. Each wireless traffic channel is identifiable by a unique combination of frequency and time slots, which will be described in more detail later. Each wireless voice traffic channel is assignable to a voice communication call involving one of the plurality of wireless remote units 104 for carrying voice data of the voice communication call. Preferably, each wireless voice traffic channel is dedicated to a voice communication call throughout the entire duration of the call. The voice traffic channel may, however, be deassigned from the voice call if, for example, a problem is encountered. In this happens, the voice call is reassigned to another voice traffic channel during the call.

As shown in FIG. 1, the plurality of wireless traffic channels includes a voice traffic channel 120 between wireless base unit 102 and wireless remote unit 108, a voice traffic channel 122 between wireless base unit 102 and wireless remote unit 110, and a voice traffic channel 124 between wireless base unit 102 and wireless remote unit 114. Each of these voice traffic channels 122, 124, and 126 is assigned and dedicated to a particular voice communication call involving its associated wireless remote unit and another subscriber outside of wireless communication system 100.

The plurality of wireless traffic channels 118 in FIG. 1 also includes a plurality of data traffic channels, such as data traffic channel 126 and a data traffic channel 134. Each wireless data traffic channel is used for carrying high speed data in addressed data packets to and from the plurality of wireless remote units 104. In FIG. 1, data traffic channel 126 is currently carrying high speed data in addressed data packets 128, 130, and 132. The data packets have source and destination addresses, where each destination address is associated with one of the wireless remote units. For example, addressed data packet 128 may have a destination address associated with wireless remote unit 106, addressed data packet 130 may have a destination address associated with wireless remote unit 110, and addressed data packet 132 may have a destination address associated with remote unit 112. As shown in FIG. 1, data traffic channel 126 is shared with wireless remote units 106, 110, and 112; data traffic channel 134 may be shared with others as well.

Figure 2:
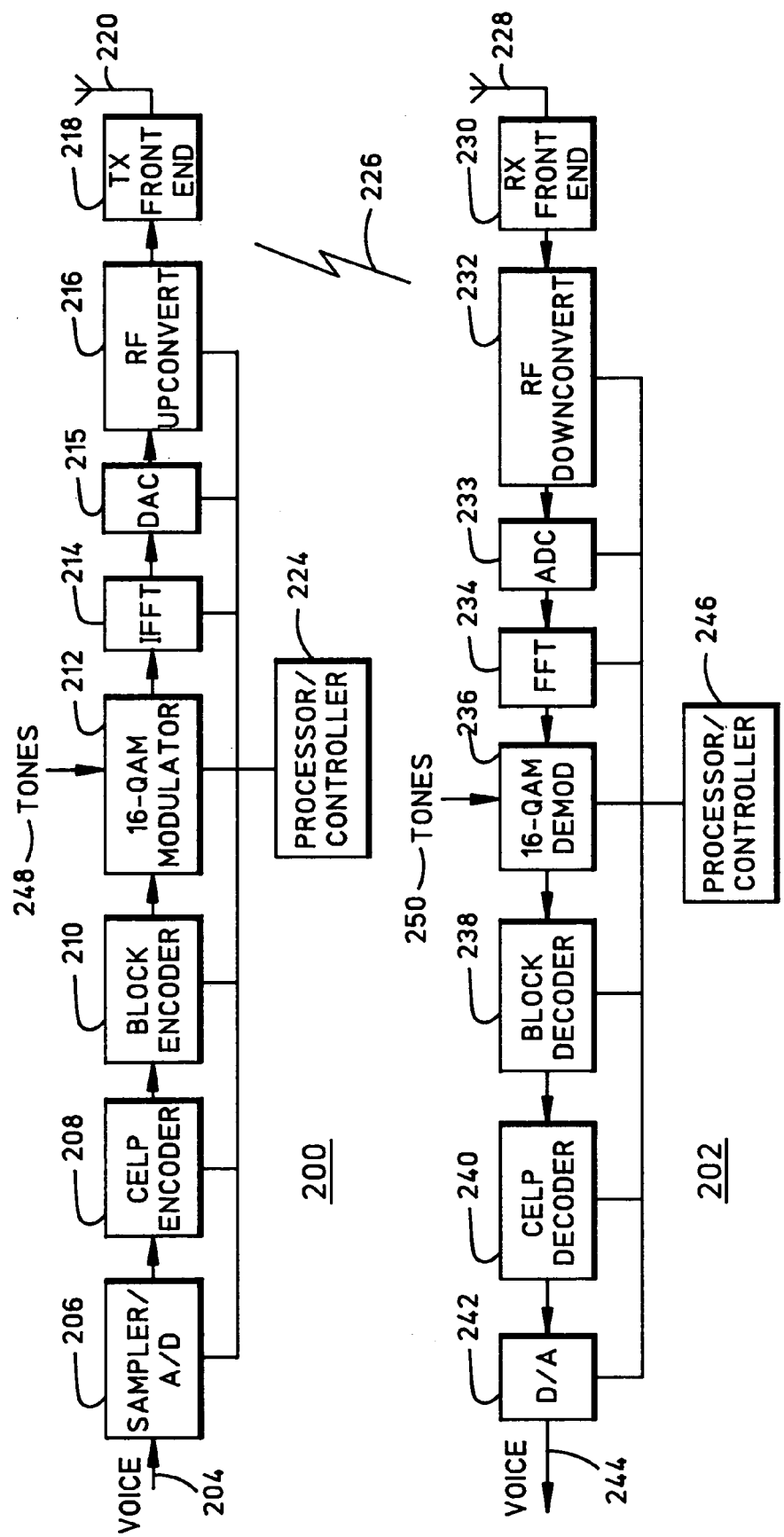
FIG. 2 is a schematic block diagram of a wireless transmitter and a wireless receiver of the wireless communication system of FIG. 1.

Referring now to FIG. 2, a wireless transmitter 200 and a wireless receiver 202 which may be utilized by a wireless base unit and a wireless remote unit (e.g., in FIG. 1), respectively, are illustrated. Wireless base and remote units each include a transmitter and a receiver (a transceiver), but are shown in this configuration for purposes of clarity and explanation. Wireless transmitter 200 and receiver 202 are shown for processing voice signals of a voice communication call. Wireless transmitter 200 includes a sampler 206, a compressor 208, a block encoder 210, a modulator 212, an Inverse Fast Fourier Transform (IFFT) processor 214, a digital-to-analog converter (DAC) 215, a radio frequency (RF) upconverter 216, a transmitter front end 218, an antenna 220, and a processor 224. Wireless receiver 202 includes an antenna 228, a receiver front end 230, an RF downconverter 232, an analog-to-digital converter (ADC) 233, a Fast Fourier Transform (FFT) processor 234, a demodulator 236, a block decoder 238, a decompressor 240, a digital to analog (D/A) converter 242, and a processor 246. In the preferred embodiment, compressor 208 and decompressor 240 are vocoders, namely Low-Delay Code Excited Linear Predictive (LD-CELP) based vocoders; block encoder 210 and decoder 238 are Reed Solomon (RS) block encoders and decoders; and modulator 212 and demodulator 236 are 16-Quadrature Amplitude Modulation (QAM) modulator and demodulators. As one skilled in the art will readily appreciate, RF upconverter 216 and downconverter 232 may involve conventional RF mixers, and transmitter and receiver front ends 218 and 230 may involve conventional power amplifiers (PAs) and low noise amplifiers (LNAs).

Figure 3:
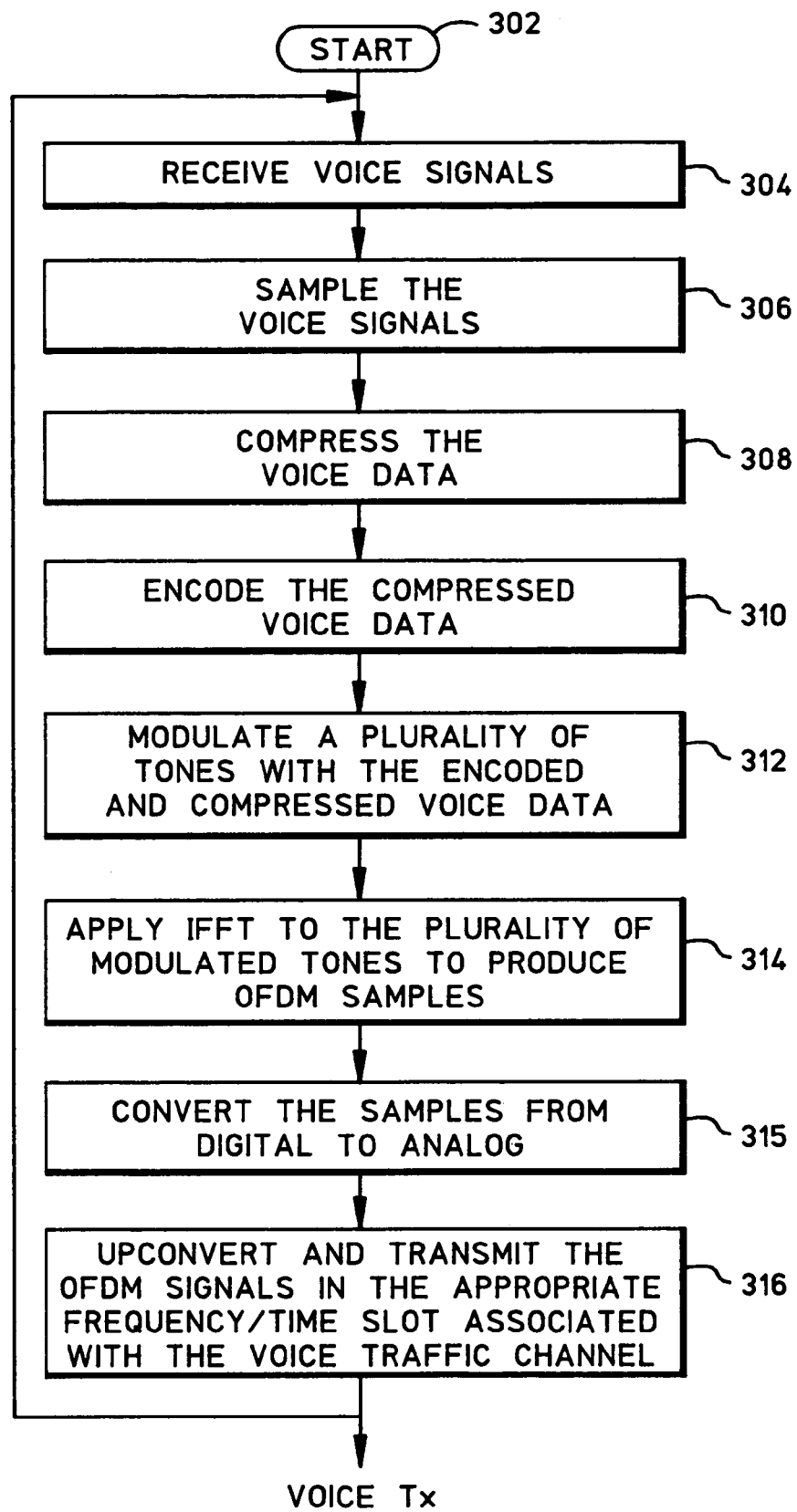
FIG. 3 is a flowchart describing a method of transmitting voice data in the wireless communication system of FIG. 1.

Referring to FIG. 3, a flowchart for processing and transmitting voice data in wireless communication system 100 of FIG. 1 utilizing wireless transmitter 200 of FIG. 2 is shown. FIGS. 2 and 3 will be referred to in combination. Beginning at a start block 302 of FIG. 3, voice signals 204 are received (step 304) and sampled by sampler 206 (step 306). The sampled voice data is compressed by vocoder 208 (step 308), and then encoded by block encoder 210 (step 310). The compressed and encoded voice data is used to modulate a plurality of tones at modulator 312 (step 312). An IFFT is performed on the plurality of modulated tones by IFFT processor 214 to produce OFDM signal samples (step 314). The OFDM signal samples are converted into analog OFDM signals by DAC 215 (step 315). The OFDM signals are upconverted by RF upconverter 216 and fed into transmitter front end 218 for RF transmission out from antenna 220 (step 316). RF OFDM signals 226 which carry the voice signals are carried over one of the voice traffic channels dedicated to the voice communication call. For transmission of the voice data, processor 224 operates to select the unique frequency and time slots associated with the assigned voice traffic channel. The process is repeated for the duration of the voice communication call.

Figure 4:
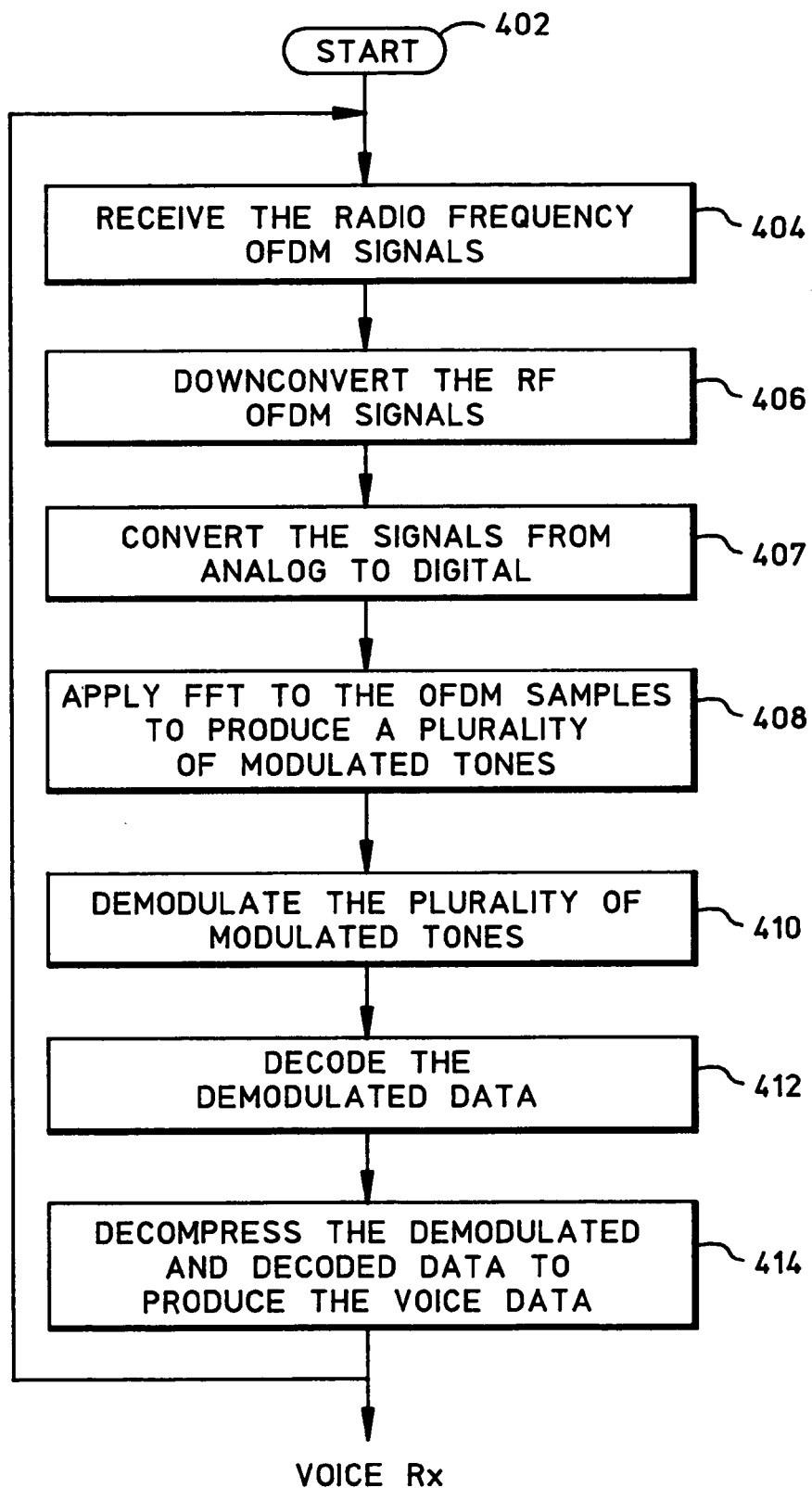
FIG. 4 is a flowchart describing a method of receiving the voice data in the wireless communication system of FIG. 1.

FIG. 4 is a flowchart for receiving and processing the voice data in wireless communication system 100 of FIG. 1 utilizing wireless receiver 202 of FIG. 2. FIGS. 2 and 4 will be referred to in combination. Beginning at a start block 402, the RF OFDM signals 226 from wireless transmitter 200 are received at antenna 228 and receiver front end 230 (step 404). The RF OFDM signals are downconverted by RF downconverter 232 (step 406) and sampled by ADC 233 (step 407). An FFT is applied to the samples in FFT processor 234 to produce a plurality of modulated tones (step 408). The plurality of modulated tones are demodulated by demodulator 236 (step 410). The demodulated data is decoded by block decoder 238 (step 412) and decompressed by decompressor 240 (step 414). After processing by D/A converter 242, the voice signals are received. For reception of the voice data, processor 246 operates to select the unique frequency and time slots associated with the assigned voice traffic channel. The process is repeated for the duration of the voice communication call.

Figure 5:
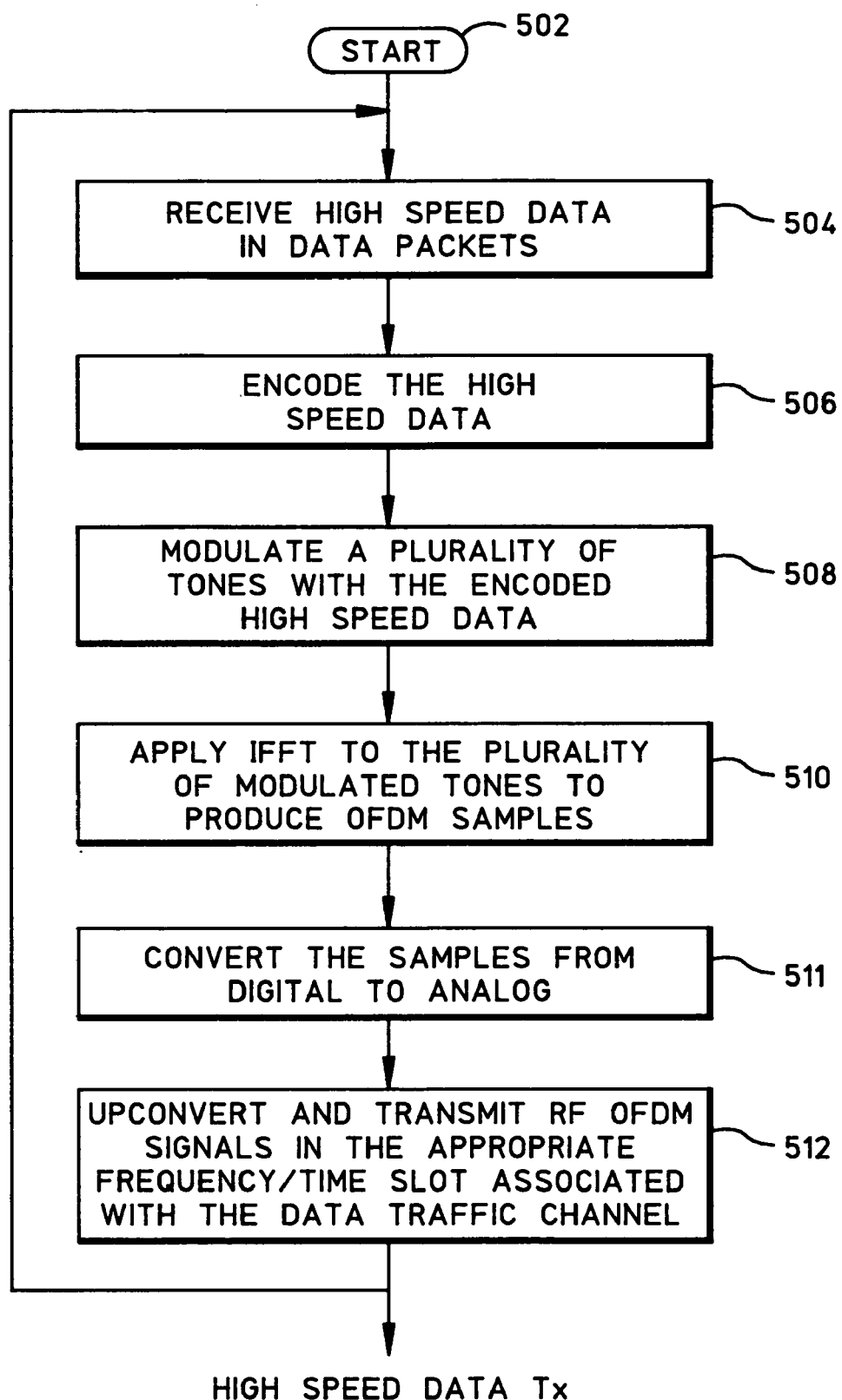
FIG. 5 is a flowchart describing a method of transmitting high speed data in the wireless communication system of FIG. 1.

FIG. 5 is a flowchart of a method of processing and transmitting high speed data in wireless communication system 100 of FIG. 1. This method may be performed by wireless transmitter 200 of FIG. 2, but without the use of sampler 206 and compressor 208. Beginning at a start block 502, high speed data such as Internet data is received in one or more data packets (step 504). The high speed data is encoded by block encoder 210 (step 506). The encoded high speed data is used to modulate a plurality of tones at modulator 312 (step 508). An IFFT is performed on the plurality of modulated tones by IFFT processor 214 to produce OFDM signal samples (step 510). The OFDM signal samples are converted into analog OFDM signals by DAC 215 (step 511). The OFDM signals are upconverted by RF upconverter 216 and fed into transmitter front end 218 for RF transmission out from antenna 220 (step 512). RF OFDM signals 226 which carry the high speed data are carried over one of the data traffic channels. For transmission of the high speed data, processor 224 operates to select the unique frequency and time slots associated with a particular data traffic channel. The process is repeated until all of the one or more data packets are transmitted.

Figure 6:
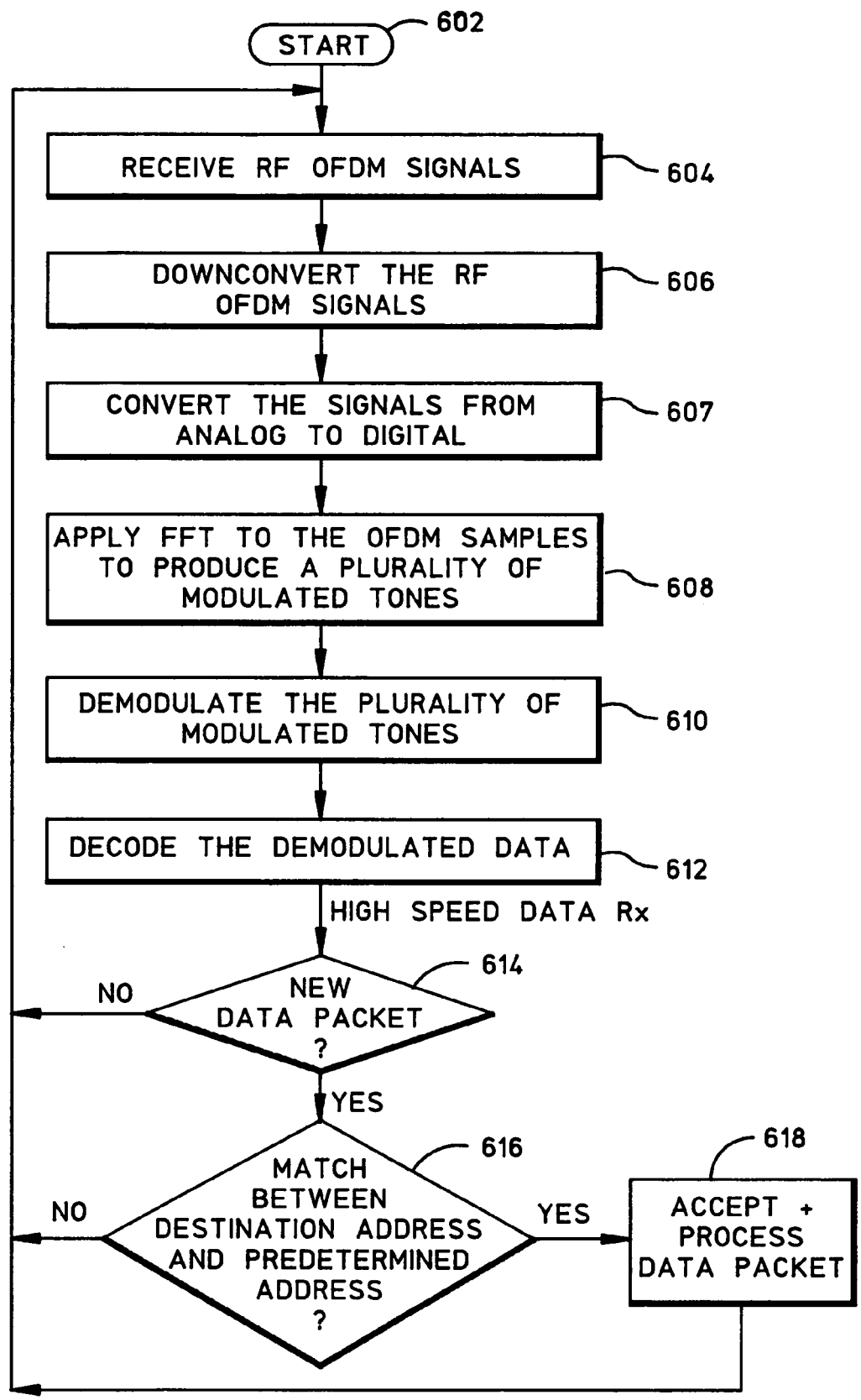
FIG. 6 is a flowchart describing a method of receiving the high speed data in the wireless communication system of FIG. 1.

FIG. 6 is a flowchart of a method of receiving and processing the high speed data in wireless communication system 100 of FIG. 1. This method may be performed by wireless receiver 202 of FIG. 2, but without the use of D/A converter 242 and decompressor 240. Beginning at a start block 602, the RF OFDM signals 226 from wireless transmitter 200 are received at antenna 228 and receiver front end 230 (step 604). The RF OFDM signals are downconverted by RF downconverter 232 (step 606) and sampled by ADC 233 (step 407). An FFT is applied to the samples in FFT processor 234 to produce a plurality of modulated tones (step 608), which are demodulated by demodulator 236 (step 610). The demodulated data is decoded by block decoder 238 (step 612) where the high speed data is eventually recovered in one or more data packets. When a new data packet is received (step 614), a destination address of the data packet is compared to the address associated with the wireless remote unit (step 616). If a match does not exist, the data packet is ignored; otherwise it is accepted and processed further (step 618). This process is repeated for one or more data traffic channels whether or not the data packets are intended for receipt by the wireless remote unit.

What is now described are additional details of a fixed wireless system (FWS), or a Personal Communication Services (PCS) Wireless Access Network (PWAN), which embodies the present invention. Wireless communication system 100 of FIG. 1 as shown and described may be such a fixed wireless system and embody such further detail. Service areas for the PWAN are divided into small regions called cells. Within each cell, there is one base and a number of remote terminals or Remote Units (RU). The protocols used for communication between an RU and a base over the airlink will be described. As described above, any RU and its corresponding base can establish a circuit-switched point-to-point full duplex link. On the downlink (forward channel), the base may also broadcast messages to all RUs in its local cell through a point-to-multipoint connection.

Figure 8:
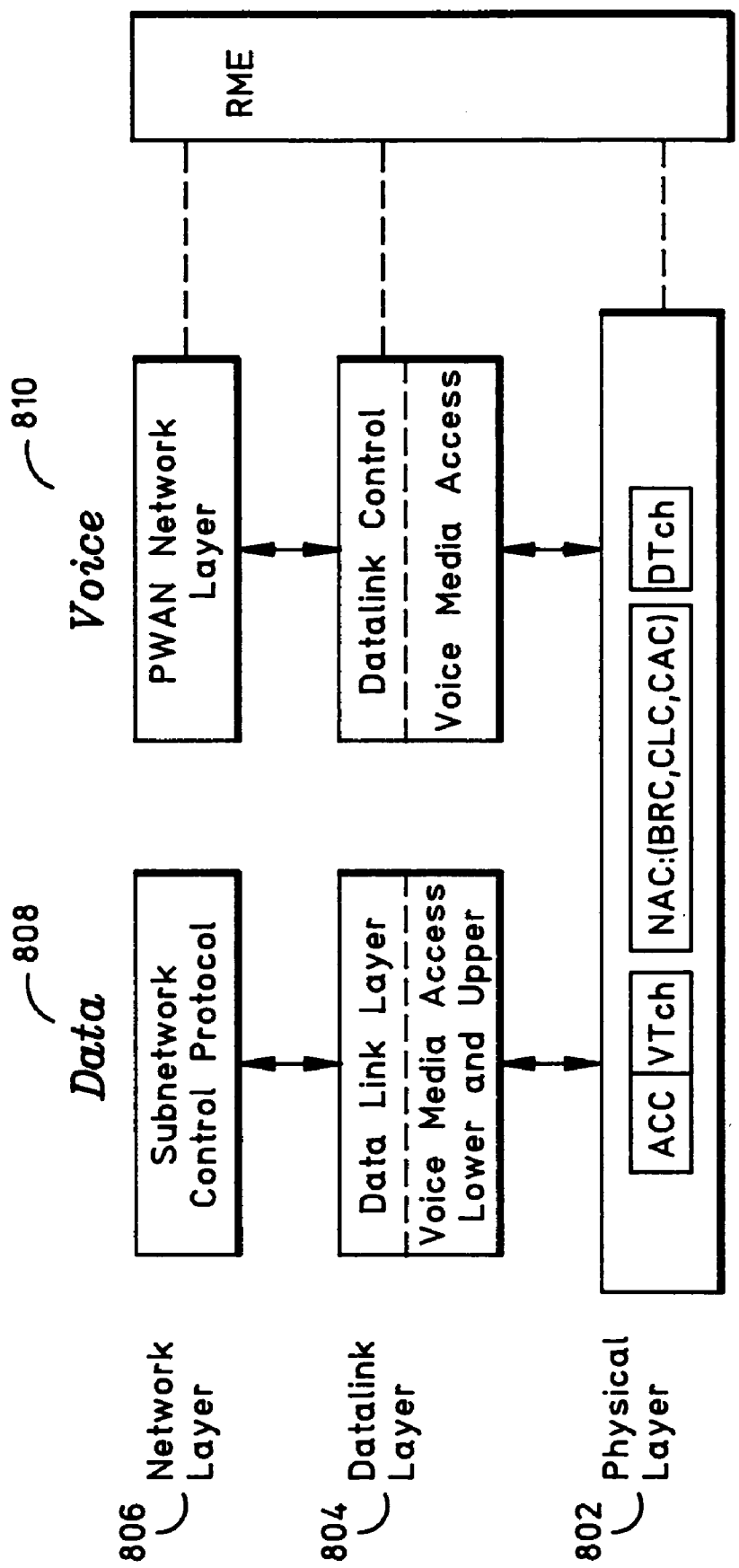
FIGS. 8 and 9 are illustrations of the layering and protocol utilized in the fixed wireless system.
Figure 9:
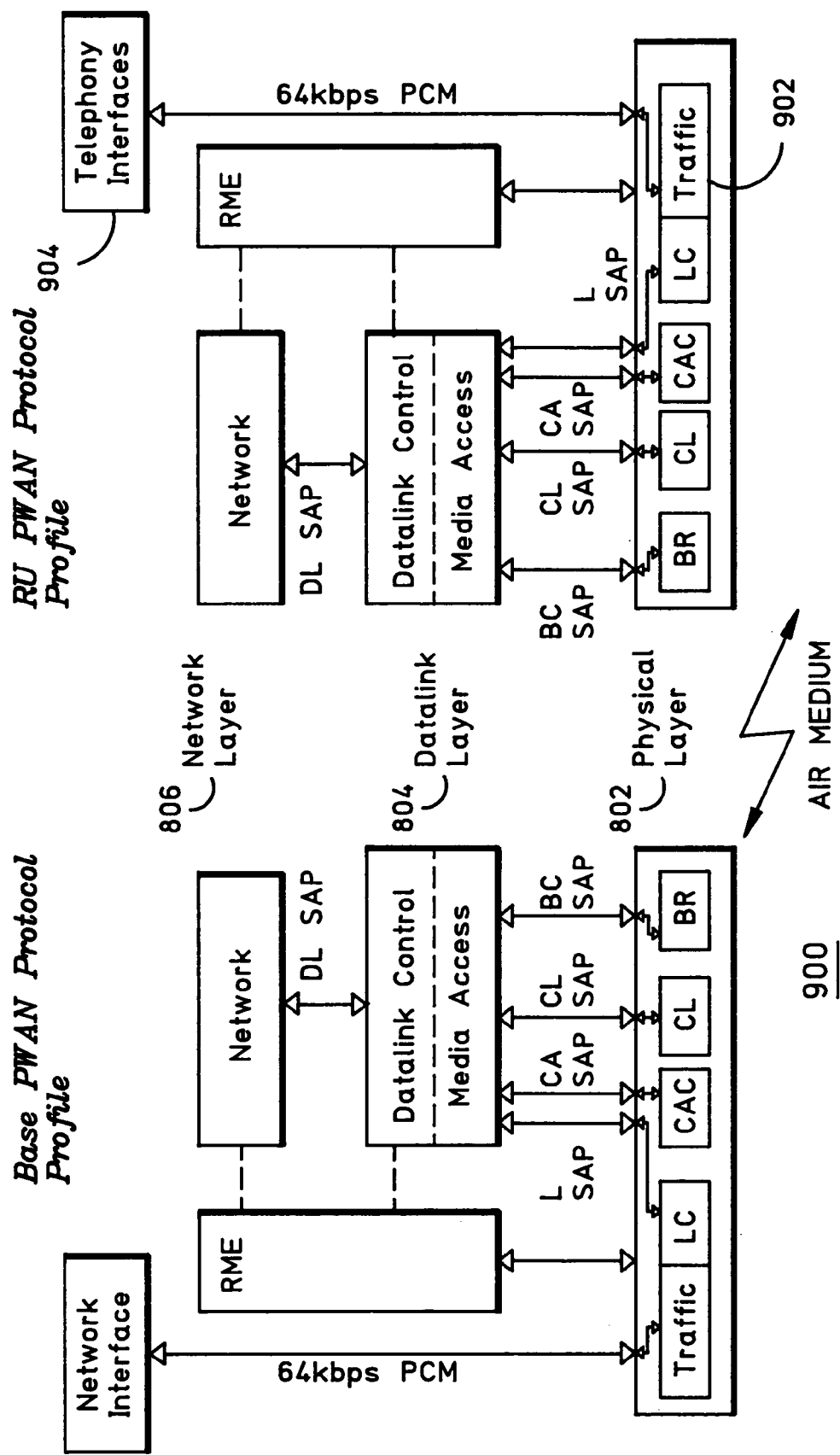
Figure 10:
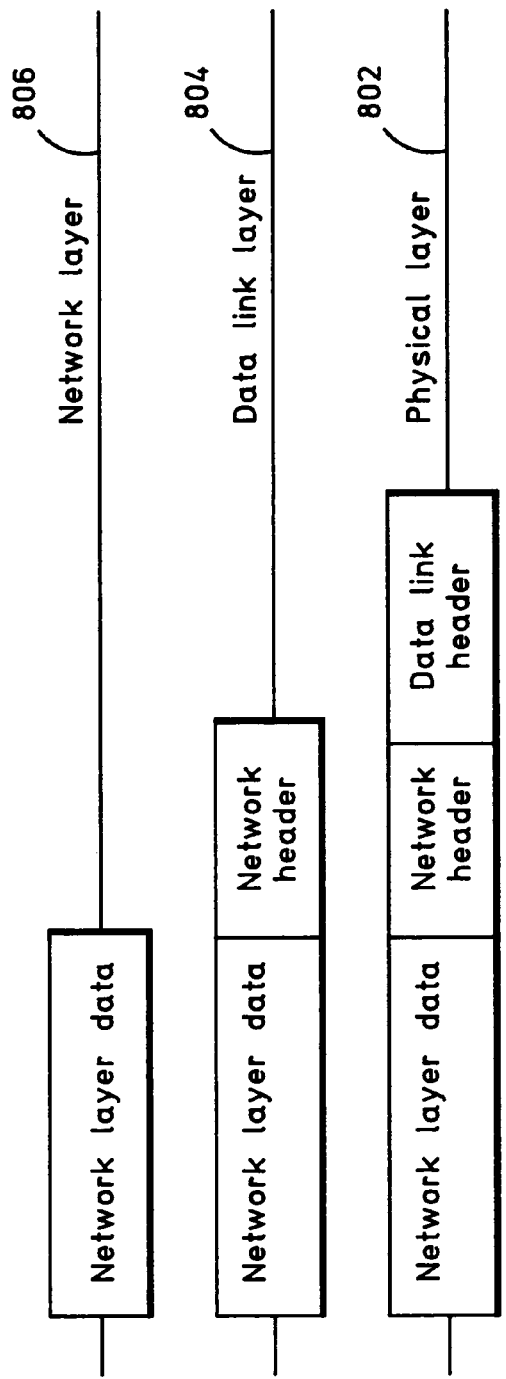
FIG. 10 is an illustration of the flow of data for the protocol utilized in the fixed wireless system.

Referring ahead to FIG. 8, the system is based on the Open System Interconnect (OSI) system model, and includes a physical layer 802, a datalink layer 804, and a network layer 806. Communication of both data 808 and voice 810 is facilitated. An airlink provides wireless communication between RUs and the base and is used for the transmission of data and control information. The airlink functions are carried using a protocol profile 900 shown in FIG. 9. Control information, such as call establishment requests or broadcast messages, is sent between peer software entities through physical layer 802. Physical layer 802 entities in the model are separated according to the division of bandwidth resources into physical channels. Each entity carries information pertinent to its function. A traffic channel entity 902 in physical layer 802 is different from the other entities with respect to its relationship to the rest of the protocol stack. Traffic channel entity 902 does not interact with data link layer 804 or any other layers in the protocol stack. It interfaces directly with the telephony unit through telephony interface 904. FIG. 10 shows the transformation of packets for control information data through the PWAN airlink protocol stack. The user data is passed as a sequence of bits from the interface to the traffic channel physical layer entity and hence does not undergo any transformation through higher layer stacks. This is a general picture of the packet transformation and is included to reflect the simplicity of the protocol and minimal processing of the control information.

Figure 11:
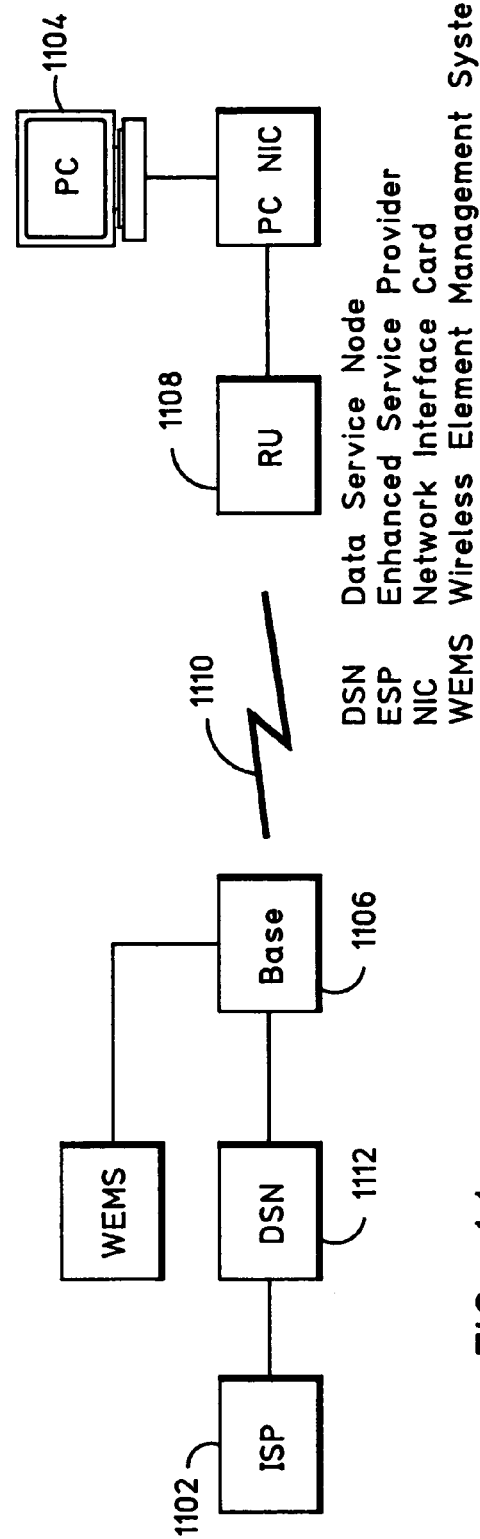
FIG. 11 is a simplified illustration of the system with respect to the use of high speed data in the fixed wireless system.

The FWS "data services" provides the customer a connectionless packet data service to an Internet Service Provider (ISP). FIG. 11 shows an ISP 1102, a data service node (DSN) 1112, a base 1106, a personal computer (PC) 1104 coupled to a remote unit (RU) 1108, where RU 1108 is coupled to base unit 1106 via an airlink 1110. This high speed data (HSD) airlink 1110 provides a reliable connectionless packet-switched connection between RU 1108 and base 1106. This connection supports the transfer of data between PC 1104 and ISP 1102, and transfer of management information to and from the RU 1108. Airlink 1110 forms one segment of the connection over which packet data travels between PC 1104 and ISP 1102. As shown in FIG. 11, a wireless element management system (WEMS) may also be coupled to base unit 1106.

A number of full duplex airlink physical channels are allocated for data traffic within a cell's coverage area. On the downlink transmission of data traffic, a subset of the frequency and time resources may be allocated to those RUs provisioned for data services. On the uplink, RUs within a sector contend for access to those frequency and time resources that are allocated for use in that sector.

Figure 12:
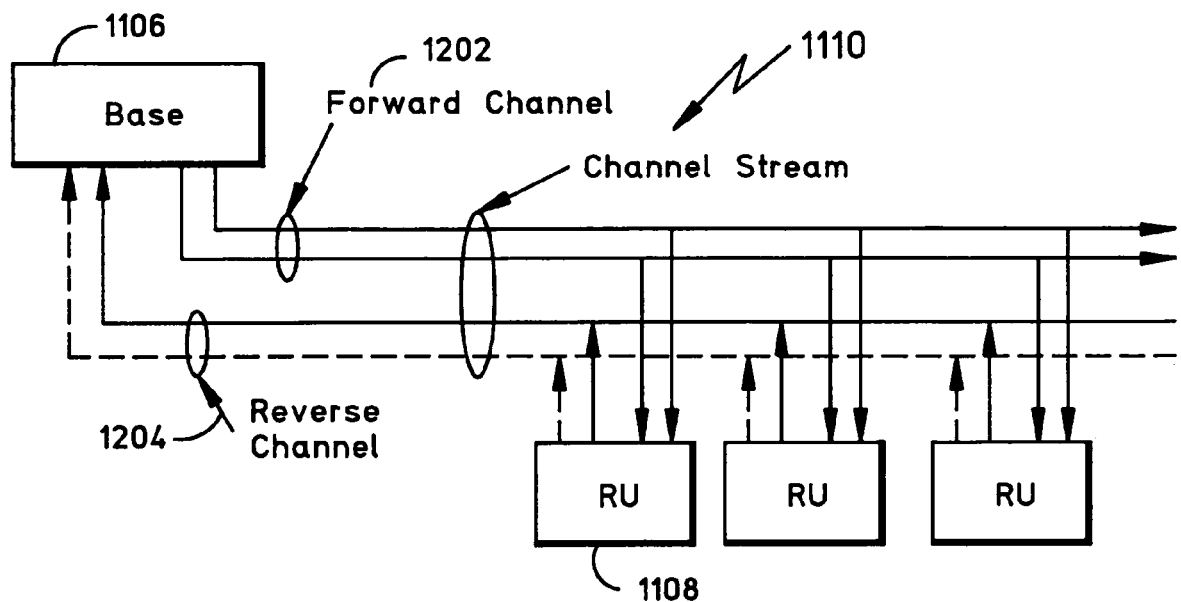
FIG. 12 is an illustration of the forward and reverse channels in the fixed wireless system.

The combination of physical channels and slots assigned to an RU constitute a "channel stream" that provides full duplex data communications capability between a base and RU. FIG. 12 is base 1106 and RU 1108 of FIG. 11, where physical channels and time slots assigned to carry base-to-RU traffic constitute the "forward channel" 1202 and those carrying RU-to-base traffic constitute the "reverse channel" 1204. Forward channel 1202 and reverse channel 1204 capacities may differ. Forward channel 1202 is a connectionless broadcast channel carrying transmission from the base to the RU only. Information is simultaneously received and decoded by all RUs assigned identical combinations of forward channels and time slots. Each RU is able to identify the transmission destination by the address carried in the transmission. Reverse channel 1204 is shared among RUs assigned identical combinations of reverse channels and time slots; arbitration of access and resolution of contention is controlled by each RU assisted by reverse channel status information returned by base 1106 on forward channel 1202 corresponding to reverse channel 1204. Airlink 1110 provides a reliable transport mechanism for the messages exchanged between base 1106 and the RU 1108. This is achieved using error detection and retransmission protocols to provide a high degree of reliability across the shared airlink medium.

Figure 13:
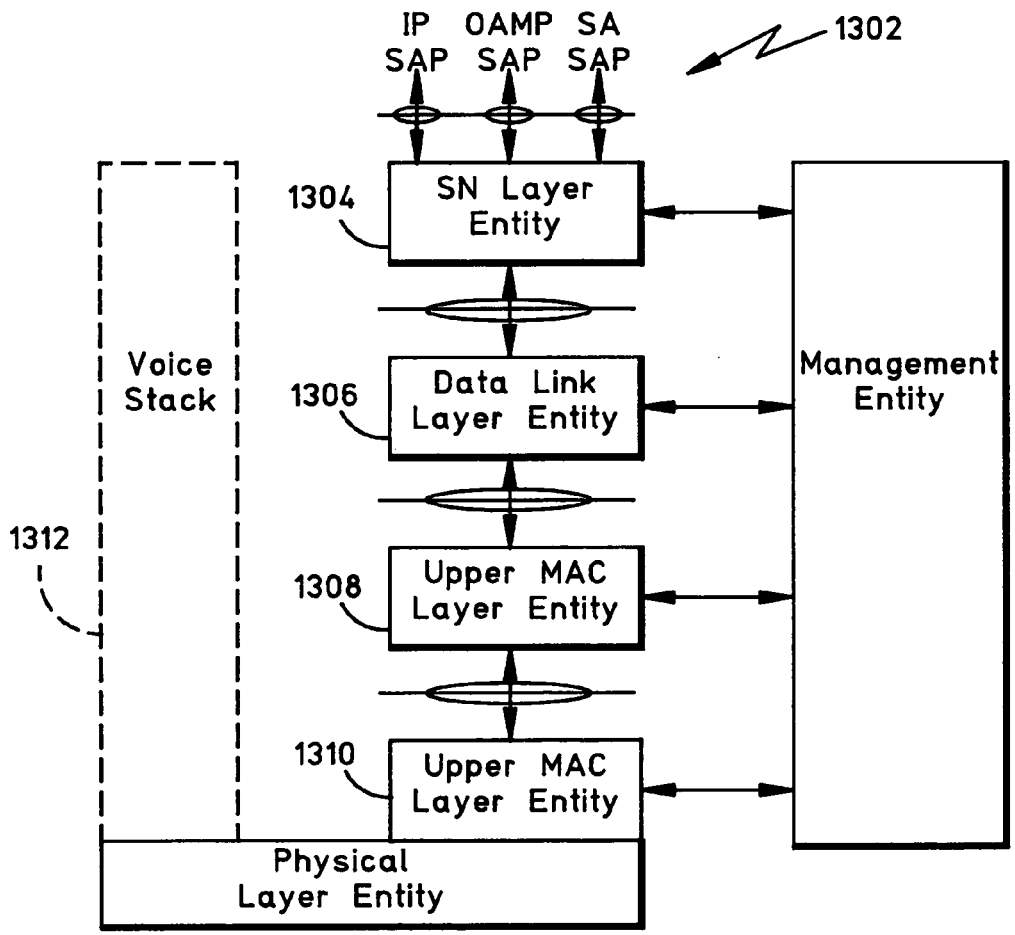
FIGS. 13 and 14 are illustrations of the airlink layering and protocol utilized in processing high speed data in the fixed wireless system.

Since the nature of services provided from the Physical Layer and up are very different, the protocol stack used for airlink data services is isolated and mostly independent of the protocol stack currently used for voice services. The airlink protocol profile is illustrated in FIG. 13. The physical layer interfaces directly with a voice stack 1312. With respect to high speed data, upper layer Protocol Data Units (PDU) 1302 from the user's EP, Security, or operations, administration, maintenance, and provisioning (OAM&P) applications are presented to the Subnetwork (SN) Layer 1304 at the base or RU and transmitted across the airlink using segmentation, reassembly, and encryption services at the SN Layer 1304; sequence integrity is provided by Link Access Protocol Wireless (LAPW) 1306, which is a form of LAP-D channel (LAPD)) defined in Consultative Committee for International Telephone and Telegraph (CCITT) Recommendation Q.921; framing services are provided by the Upper MAC Layer 1308; and medium access, physical modulation, encoding, and error detection services are provided by DSMA/CD (described later below) at the Lower Medium Access Channel (MAC) Layer 1310.

Figure 14:
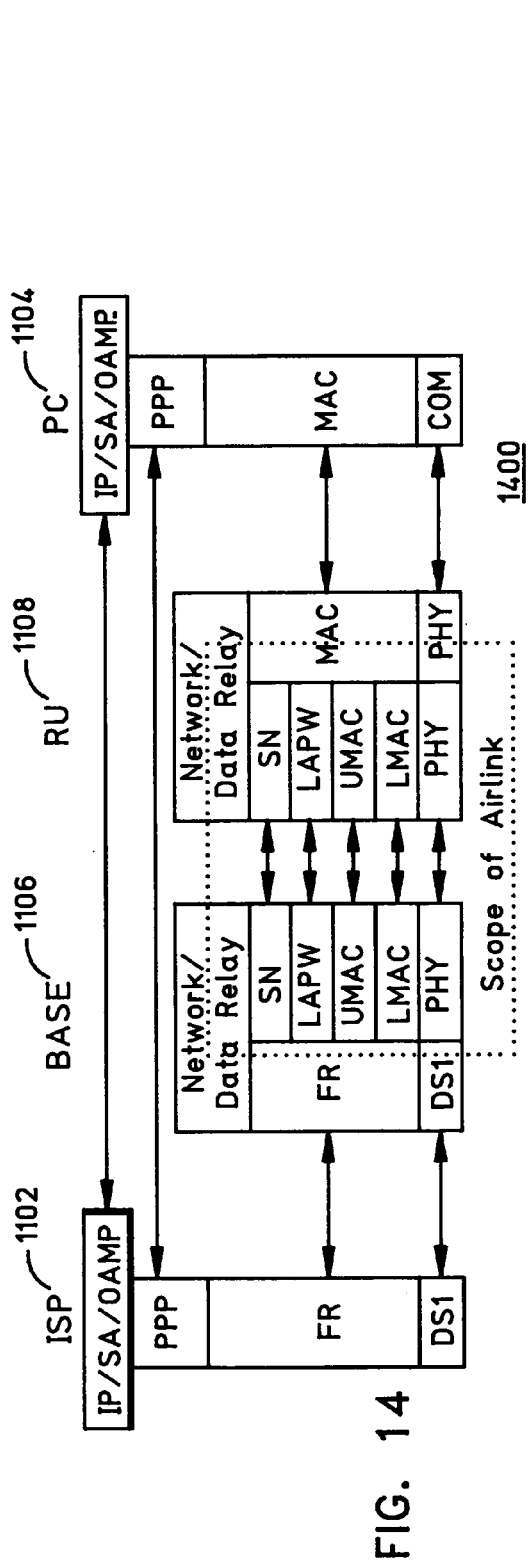
Figure 16:
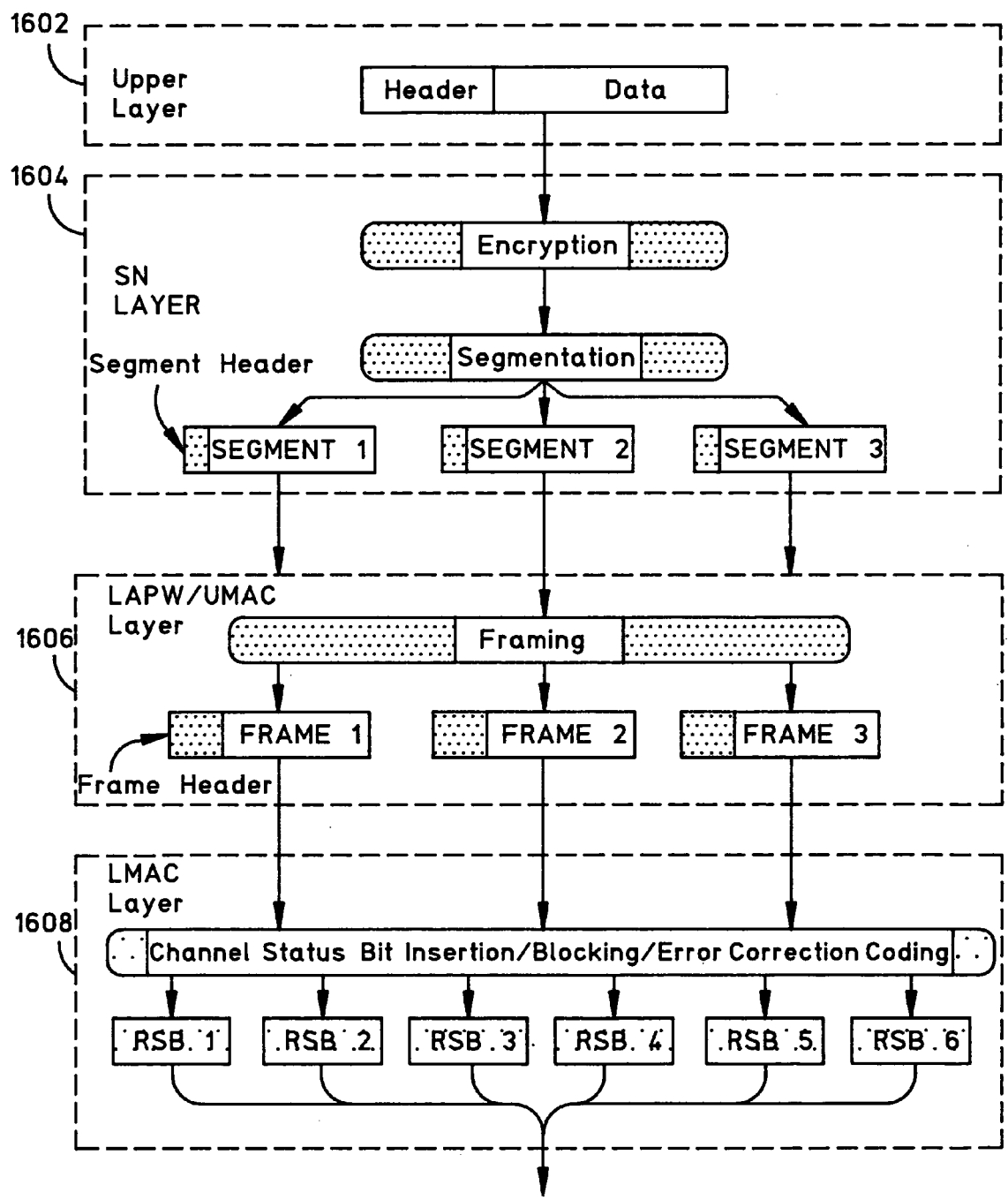
FIG. 16 is a flow diagram for processing high speed data in the fixed wireless system.

FIG. 14 shows an airlink protocol profile 1400 with respect to data services. More particularly, the protocol layers in airlink protocol profile 1400 involve ISP 1102, base 1106, RU 1108, and PC 1104 of FIG. 11. The packet transformations undergone by an individual upper layer PDU employing the secure class of service are summarized in FIG. 16. FIG. 16 illustrates an upper layer 1602, a subnetwork layer 1604, a LAPW/UMAC layer 1606, and an LMAC layer 1608 corresponding to those layers shown in FIG. 14. The following steps are performed at the Subnetwork Layer 1604: (1) the packet is encrypted; and (2) the encrypted packet is segmented and each segment is provided with a segment header. The following step is performed at the LAPW Layer 1606: the segments are transmitted, retransmitted if necessary, and verified to arrive in order. The following steps are performed at the UMAC Layer 1606: (1) frame check sequence (FCS) is calculated over the segment; and (2) each segment and its FCS are framed for transmission. Finally, the following steps are performed at the LMAC Layer 1608: (1) the bit stream is blocked into consecutive sets of bits; (2) each segment is transmitted and retransmitted if necessary across the link in accordance with channel access rules; and (3) each block is augmented with any necessary channel status and control information and transmitted over the airlink.

The data service initializes HSD connectivity at the physical layer by employing a network access approach similar to that used by voice. The RU contends on the unsolicited common access channel (UCAC) to request the assignment of a physical channel and a point-to-point data link temporary equipment identifier (TEI). The base responds with channel and TEI assignments which the RU acknowledges. From this point forward, all data transport and link management is accomplished on the assigned data channels using the assigned RU TEI. Initialization at the MAC, data link, and network layers are accomplished using peer protocols as needed at the respective layers. The HSD airlink services remain in place perpetually for all RUs to provide a permanent OAM&P channel. Only RUs for which subscriber services have been activated are enabled to carry user traffic. The RU or base terminates connectivity by placing a request over the connection-oriented data link layer protocol. General link failure conditions detectable at the base or RU may also trigger data link termination independently at the base or RU. Due to the need to maintain an open OAM&P channel, the RU does not tolerate a persistent link termination. Thus, the typical behavior is for the link to be automatically re-initialized by the RU.

The base and the RU employ a Digital Sense Multiple Access/Collision Detect (DSMA/CD) algorithm for access arbitration and contention resolution. DSMA/CD is a special type collision sense multiple access (CSMA) that relies on successfully demodulating a forward control channel before broadcasting data back on a reverse channel. Each RU attempts to detect a busy/idle flag which is interspersed by the base on the forward channels. When the busy/idle flag indicates that the base detects no RUs transmitting on the corresponding reverse channel, an RU is free to transmit a packet on the available reverse channel(s). If the base indicates that a received block was unsuccessfully decoded, this is indicated on the corresponding forward channels with a decode status flag. Each transmitting RU abandons an ongoing transmission and defers to a later time to retransmit if the decode status indicates that the base was unable to decode a received block, implying that the transmission was likely corrupted by a collision.

Figure 15:
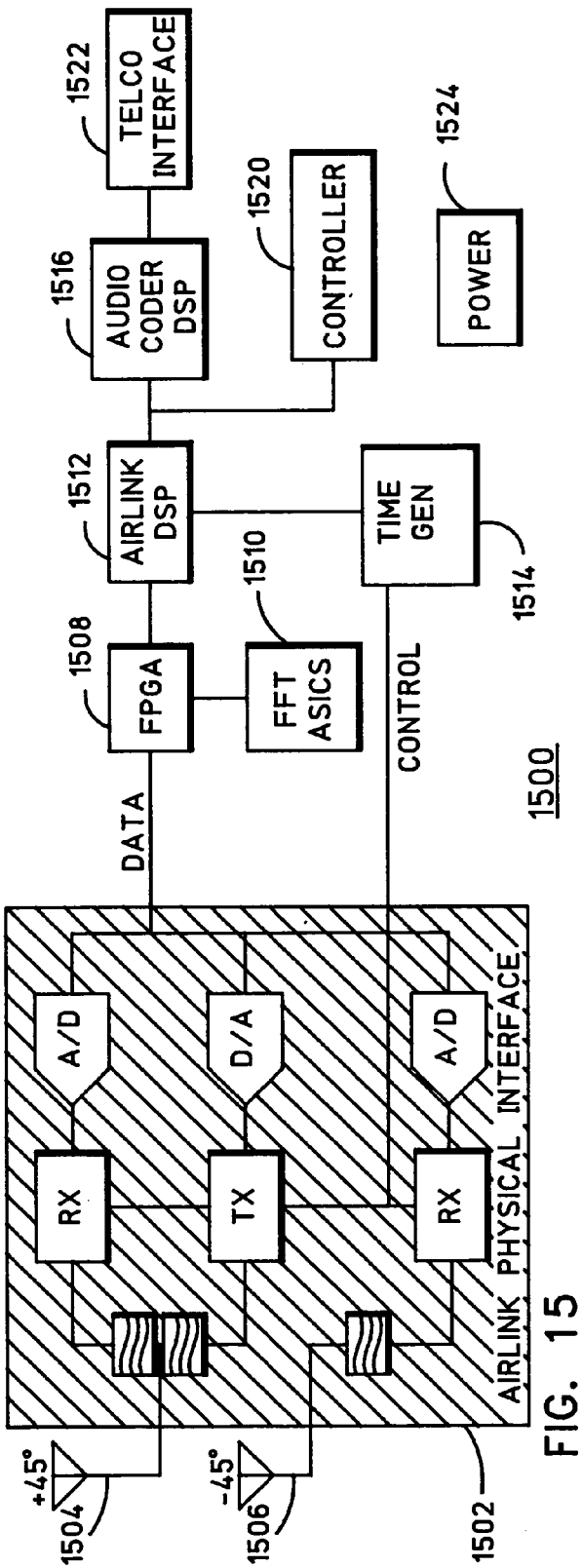
FIG. 15 is a schematic block diagram of a remote unit (RU) of the fixed wireless system.

Turning now to hardware aspects of the system, FIG. 15 is a schematic block diagram of a remote unit. As shown, remote unit has electronic circuitry 1500 which includes diversity antennas 1504 and 1506 coupled to an airlink physical interface 1502, a field programmable gate array (FPGA) 1508, two Fast Fourier Transform (FFT) application-specific integrated circuits (ASICs) 1510, an airlink digital signal processor (DSP) 1512, a time generator FPGA 1514, an audio coder DSP 1516, a controller 1520, a telco interface 1522, and power supply circuitry 1524. Airlink physical interface 1502 has a two-branch RF receiver with two analog-to-digital (A/D) converters, and a single branch RF transmitter with a digital-to-analog (D/A) converter. FFT ASICs 1510 and FPGA 1508 provide a frequency-to-time/time-to-frequency domain translation engine for OFDM waveforms. Airlink DSP 1512 performs the airlink physical layer processing and audio coder DSP performs the OFDM vocoder functions. Time generation FPGA 1514 provides a serial time division multiplex (TDM) interface along with hardware support for RF control. Telco inteface 1522 has a subscriber link interface circuit to provide an interface to a customer's telephone wiring. Controller 1520 provides control for most of these devices, and power supply circuitry 1524 provides electrical power for operation of the devices. Preferably, airlink and audio coder DSPs 1512 and 1516 utilize DSPs provided by Texas Instruments and controller 1520 utilizes an MC68360 Quad Integrated Communications Controller (QUICC) CPU provided by Motorola, Inc.

Specifics regarding the PWAN physical layer are now described. The PWAN physical layer is based on an OFDM waveform comprised of multiple frequency domain channels as well as multiple time domain slots per frequency channel. Transmissions between a PWAN base and RU are carried out in a Frequency Division Duplex (FDD) manner with 80 MHz of separation between downlink and uplink transmissions. The PWAN system is designed to operate in the United States wideband Personal Communication Services (PCS) spectrum defined in part 24 of the Federal Communications Commission (FCC) regulations. The model of operation for the physical layer is based on the general OSI layer model.

Figure 7:
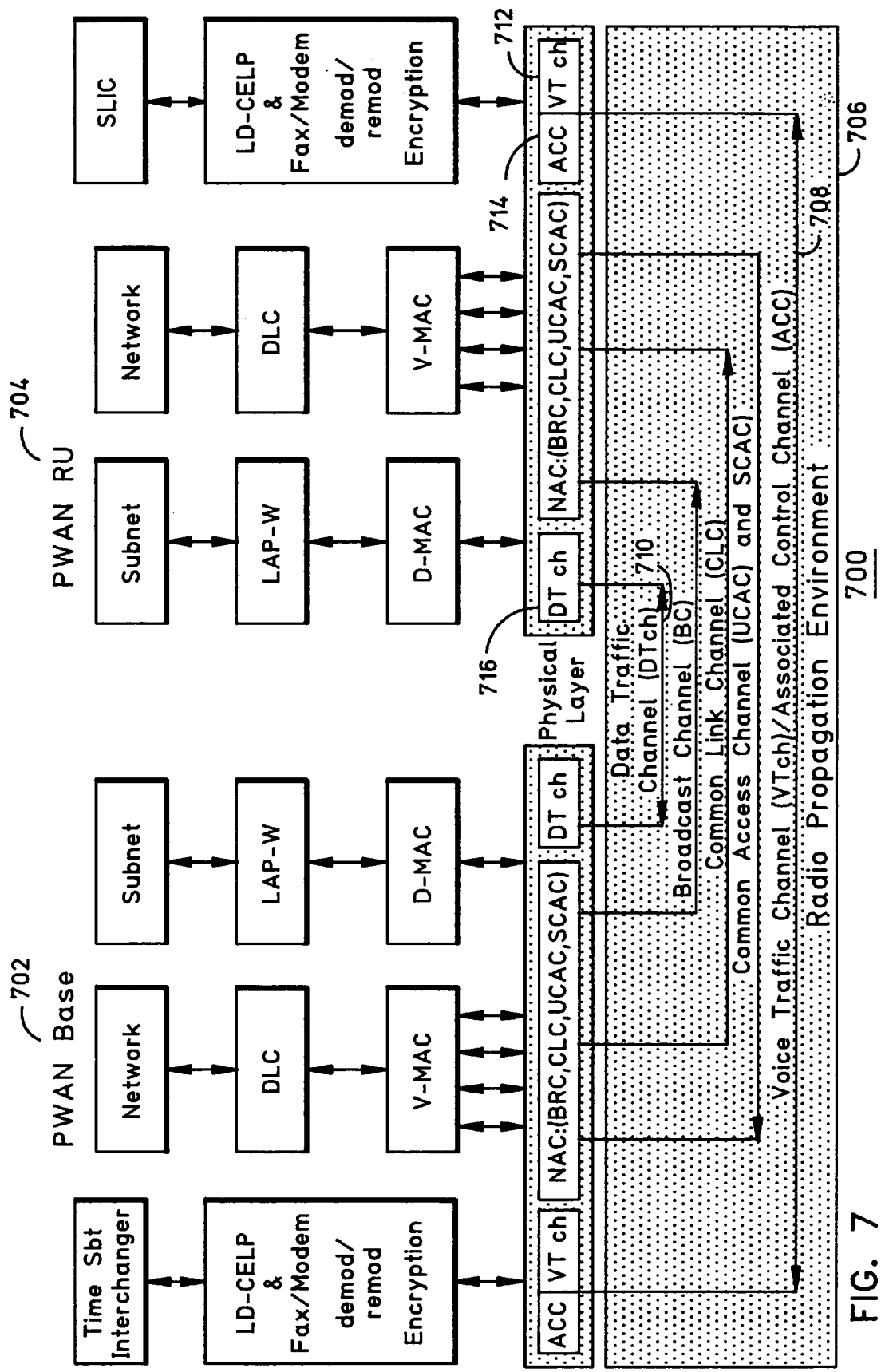
FIG. 7 is an illustration of an OSI layer model of a detailed embodiment of the present invention, which is a fixed wireless system, showing an airlink and a plurality of channels.

Referring back to FIG. 7, the specific application of the OSI layer model to the PWAN airlink protocol stack 700 is shown. Communication takes place between peer physical layer entities at an RU 704 and a base 702. The peer entities communicate over the air using their corresponding channel resources, which include a Voice Traffic Channel 708 (VTch) and Associated Control Channel or ACC, a Data Traffic Channel (DTch) 710, a Broadcast Channel (BRC), a Common Link Channel (CLC), and a Common Access Channel (CAC). As shown, the physical layer is divided accordingly into six separate entities. Each entity communicates with its respective peer on a unique channel or a pair of channels. The physical layer entities are as follows: (1) Voice Traffic channel (VTch) entity 712; (2) Associated Control Channel (ACC) entity 714; (3) Data Traffic channel (DTch) entity 716; (4) Common Access Channel (CAC) entity; (5) Common Link Channel (CLC) entity; and (6) Broadcast Channel (BRC) entity. The Voice Traffic, ACC and Data Traffic entities 712, 714, and 716 are the only entities that communicate on both the uplink and downlink directions. The uplink is defined as communication from the RU 704 to the base 702. The downlink is defined as communication from base 702 to a population of RUs.

The PWAN airlink is designed to operate in one of the PCS spectrum blocks licensed by the FCC for a given trading area. In a 10-MHz license, up to four PWAN subbands are defined. Each subband occupies 2.0 MHz of spectrum split between the upper and lower RF band. The separation between the lowest frequency in the lower RF band and the lowest frequency in the upper RF band is 80 MHz. The upper RF band is used for base transmission (RU receive). The lower RF band is used for RU transmission (base receive).

Figure 19:
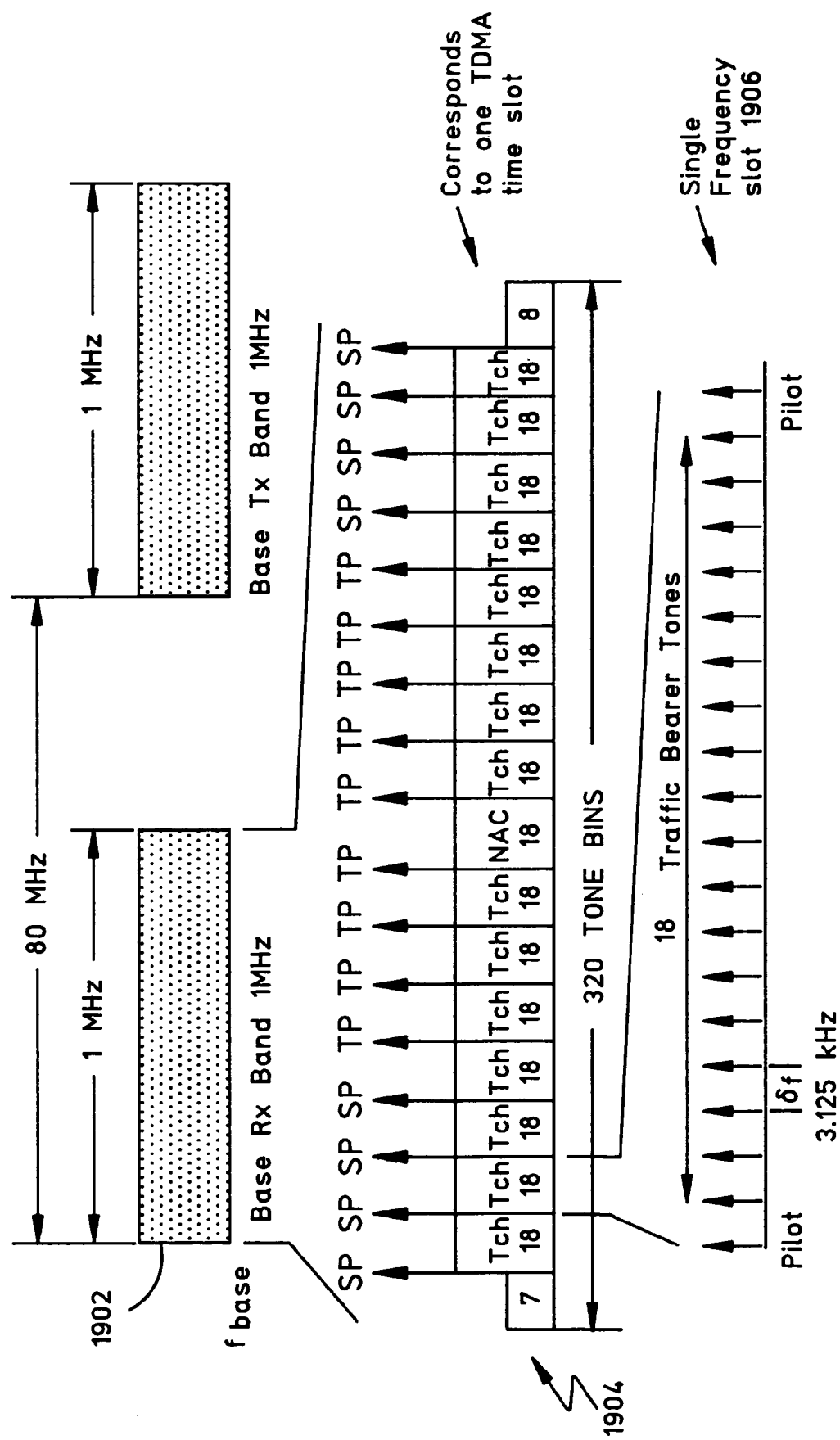
FIG. 19 is an illustration of the frequency allocation in the fixed wireless system.

Referring now to FIG. 19, each 1.0-MHz subband 1902 is divided into 320 consecutive carrier frequency slots 1904, referred to as tone bins, which are evenly spaced at intervals of 3.125 kHz. 288 tone bins are allocated to bearer traffic channel use; the modulated narrow band carriers that occupy these bins are referred to as traffic bearer tones, or "tones." Each cluster of eighteen contiguous tone bins represents a bearer channel, or f-slot, such as a frequency slot 1906. Seventeen tone bins, one separating each cluster, are allocated to the network synchronization channel. The pilot carriers that occupy these singular bins on the downlink channel are referred to as RU Synchronization Pilots (RSPs). When on the uplink, the synchronization channel tones are referred to as Delay Compensation Pilots (DCPs). The remaining fifteen tone bins per 1.0-MHz band are not energized and are allocated to interband guard bins, seven bins on the low end and eight bins on the high end of the subband. The structure for the upper and lower sub-bands is identical. The tone bins within each band are indexed from $TB_0$ to $TB_{319}$ with the center frequency of $TB_0$ located exactly 1.5625 kHz above $f_{base}(n)$.

Figure 17:
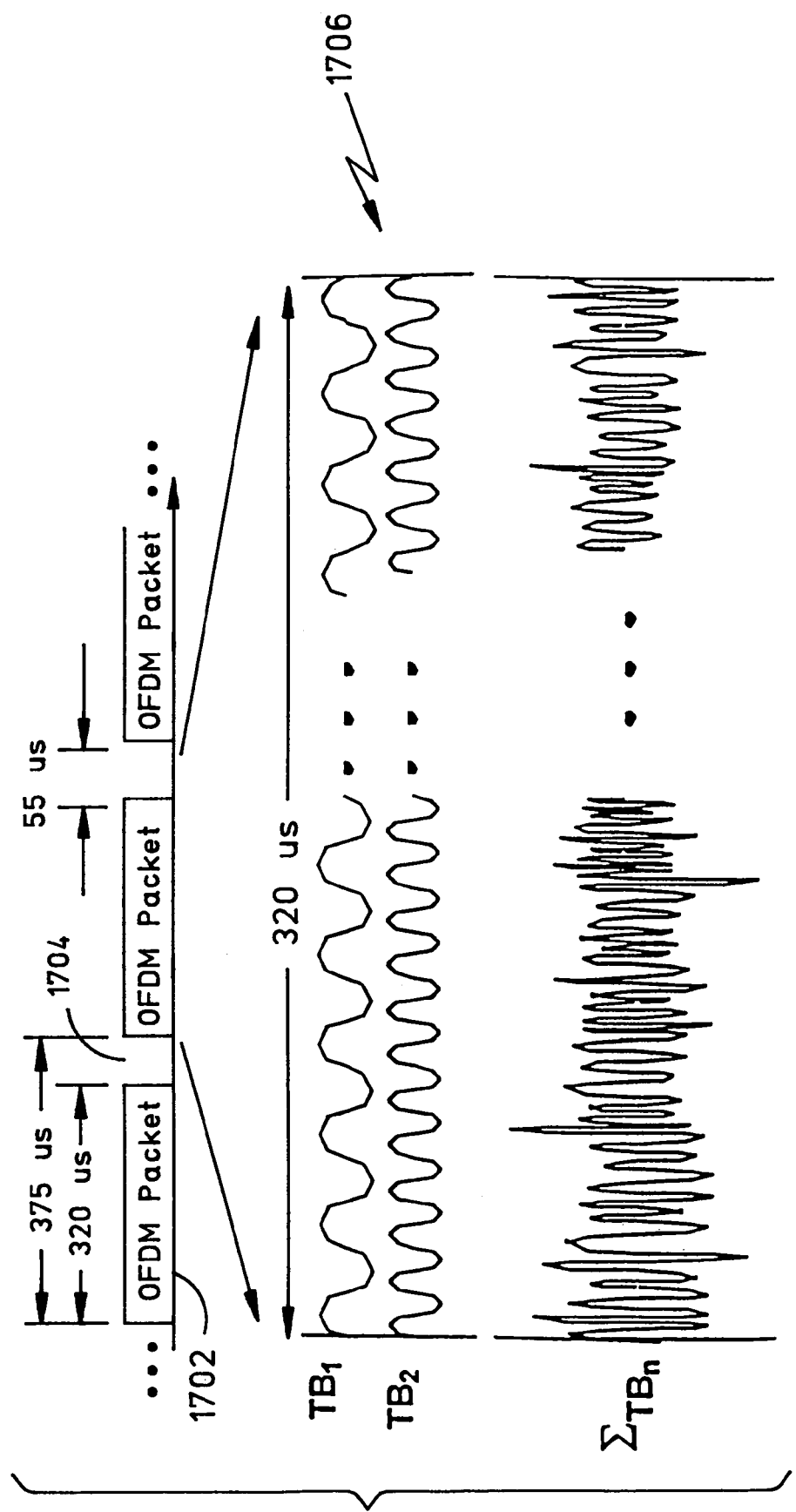
FIG. 17 is an illustration of radio frequency (RF) Orthogonal Frequency Division Multiplexing (OFDM) communication signals utilized in the fixed wireless system.
Figure 18:
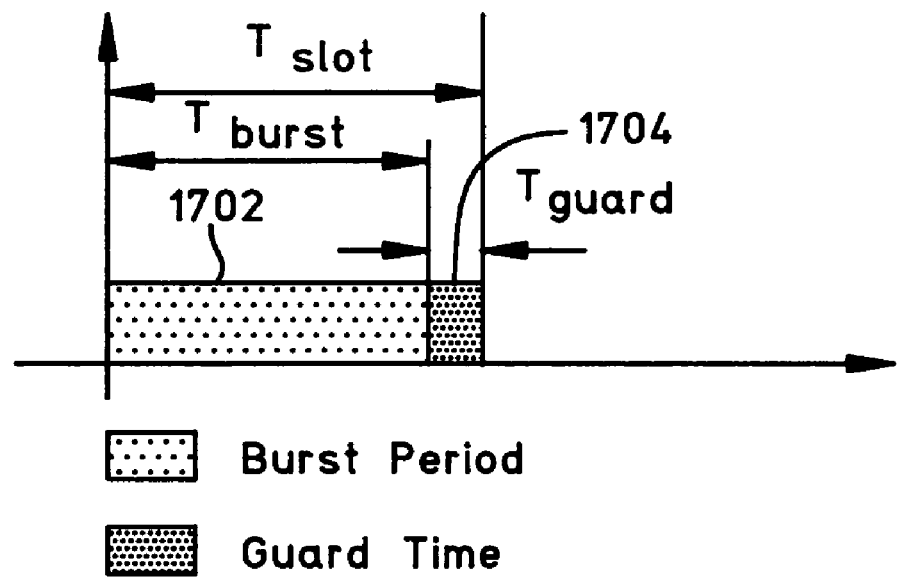
FIG. 18 is an illustration of the timing involved with respect to each OFDM burst or packet.

Referring now to FIGS. 17 and 18, the transmitted waveform has an envelope that corresponds to a 320 microsecond OFDM pulse 1702 followed by a 55 microsecond guard time 1704. The time domain OFDM waveform is comprised of up to 305 superposed sinusoidal carriers (tones) 1706 (FIG. 17 only). Each carrier is modulated in amplitude and phase with a single data symbol for the entire 320 microsecond transmit period. The composite OFDM waveform is the summation of all active tone bins during each transmit period. When one or more traffic channel is transmitted, the amplitude of the time domain signal has a gaussian probability density distribution. The characteristics of the probability density function (PDF) are zero mean and the variance is equal to the power. In every TDMA slot, there is a transmission burst and a guard time. Data is transmitted in each burst using multiple tones. The burst duration is $T_{burst}$. A guard period of duration $T_{guard}$ is inserted after each burst.

Figure 20:
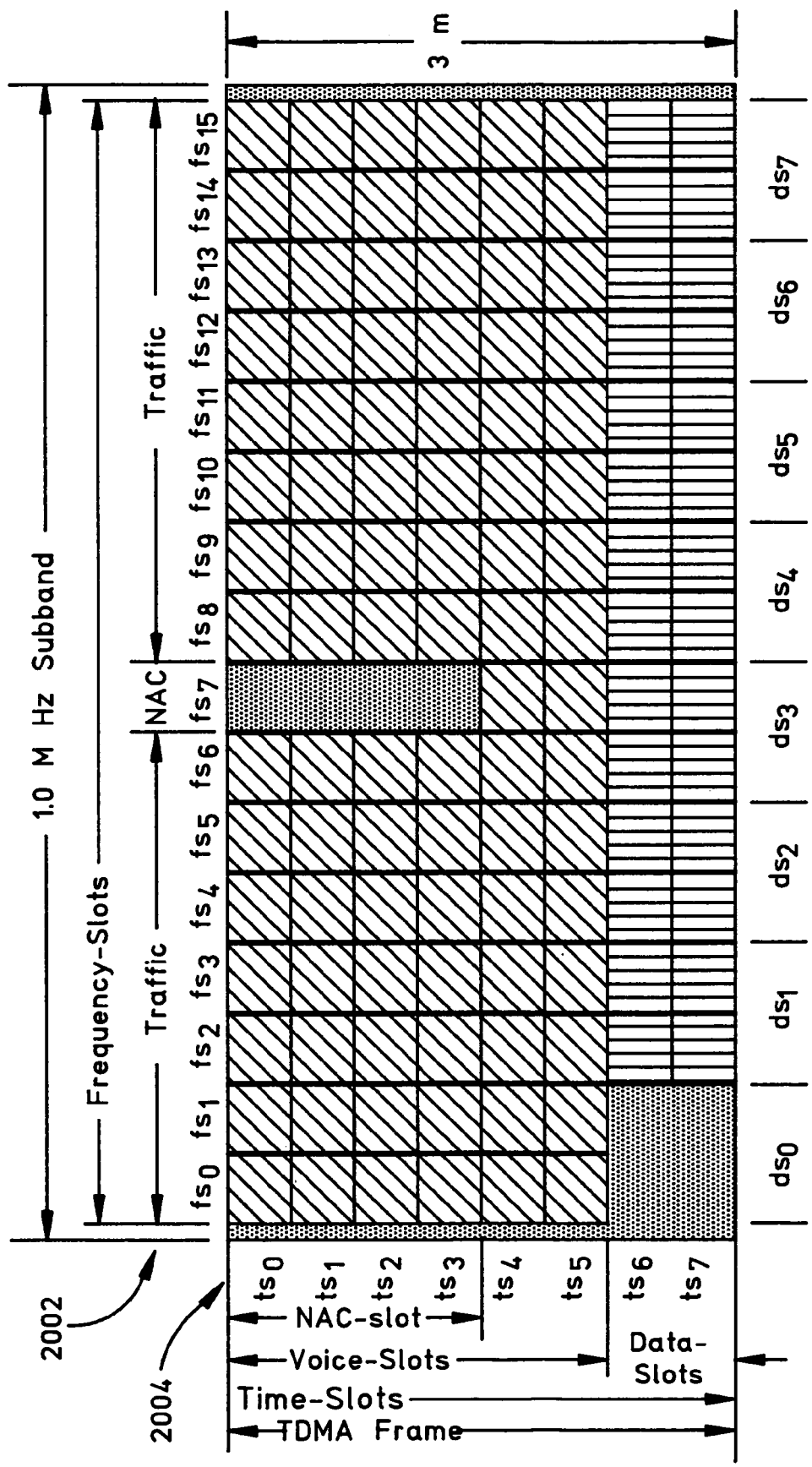
FIG. 20 is an illustration of the time and frequency slots which form channels for communicating data to multiple remote units in the fixed wireless system.

FIG. 20 shows the channel resource mapping for the voice, data, and network access logical channels. In a 1.0-MHz subband, 16 frequency slots 2002 and eight time slots 2004 form the set of channel resources available for the logical channels supported in the PWAN system. Any suitable number of time and frequency slots are acceptable for such a system. Each voice traffic channel for a user is associated with a unique combination of time (e.g., one of $ts_0$–$ts_5$) and frequency slots (e.g., one of $fs_0$–$fs_6$ and $fs_8$–$fs_{15}$). In addition, each data traffic channel is associated with a unique combination of time (e.g., $ts_6$ and $ts_7$) and frequency slots (e.g., one of $ds_1$–$ds_7$). The synchronization channel, comprised of 17 singular tone bins, is interspersed between each bearer cluster.

As shown, there are sixteen frequency slots defined for bearer traffic channels consisting of 18 bearer tones each. Since the NAC occupies half of one of these frequency slots over time, there remains (8*16)–4=124 frequency-time resources (FTRs) available for bearer traffic services. A base can be configured for either one or two Basic Data Service Allocations (BDSA). Each BDSA occupies all 16 frequency slots in two fixed time slots (32 FTRs per BDSA). For each BDSA provisioned, the number of FTRs remaining for active voice service is reduced by 32. That is, either 60 or 92 FTRs are typically provisioned for voice traffic (two or one BDSA, respectively). Currently, at least one BDSA is provisioned since the OAM&P functions are conducted over the high speed data (HSD) service. The default BDSA is allocated in time slots $ts_6$ and $ts_7$.

Figure 21:
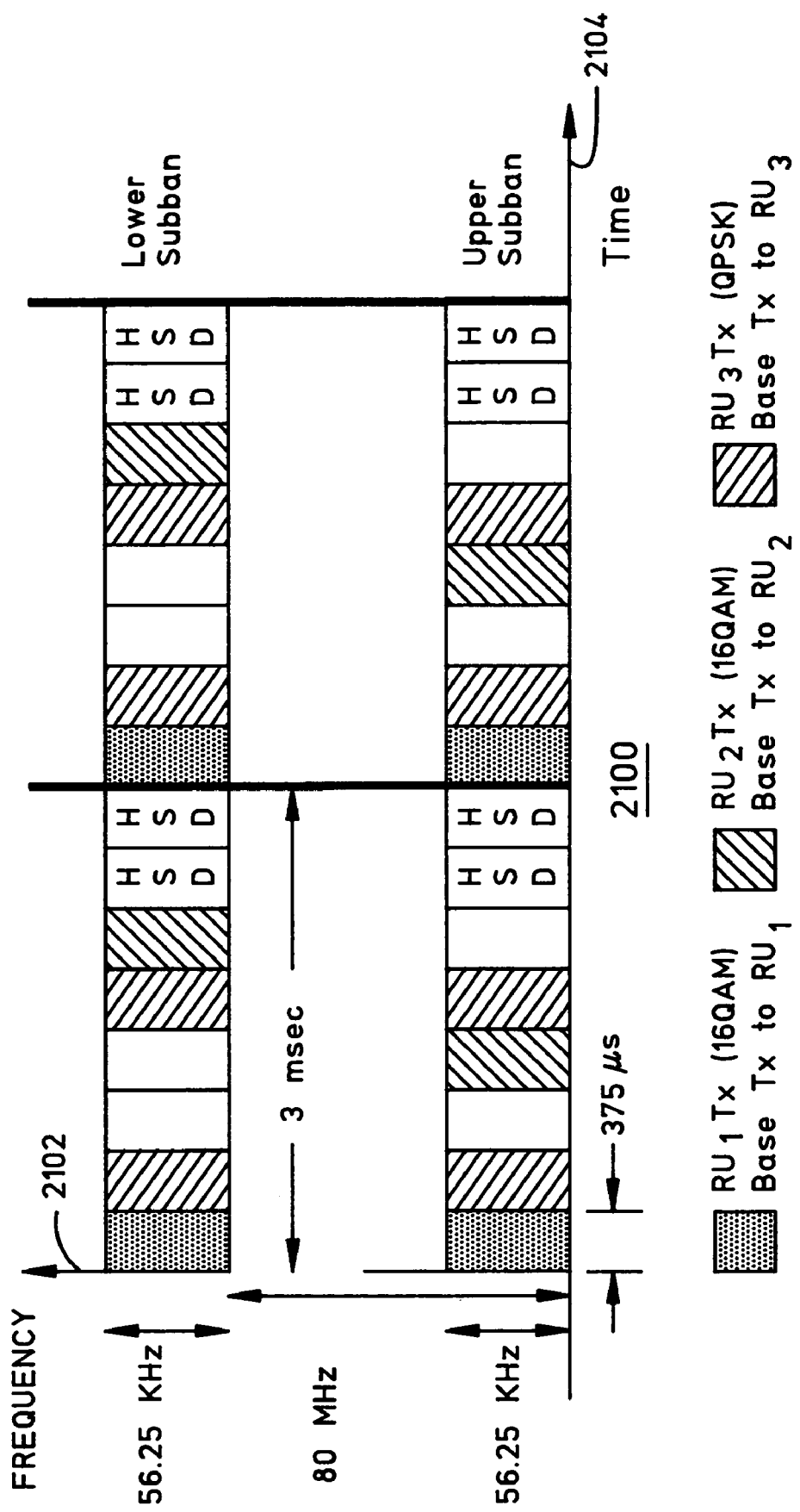
FIG. 21 is an illustration of the time multiplexing involved for multiple remote units in the fixed wireless system.

A physical voice channel using 16 QAM modulation consists of a single FTR per TDMA frame (equivalent to eight TDMA time slots) for the duration of the call. FIG. 21 presents the time multiplexing structure for multiple RUs in a graph 2100 having a frequency axis 2102 and a time axis 2104. Note, as for $RU_2$ in FIG. 21, that there is no implication that uplink and downlink channels be paired. The resource management entity (RME) must maintain and account for the resource utilization under these adaptive modulation conditions. The HSD service represented in FIG. 21 is allocated the last two time slots in each TDMA frame.

Figure 22:
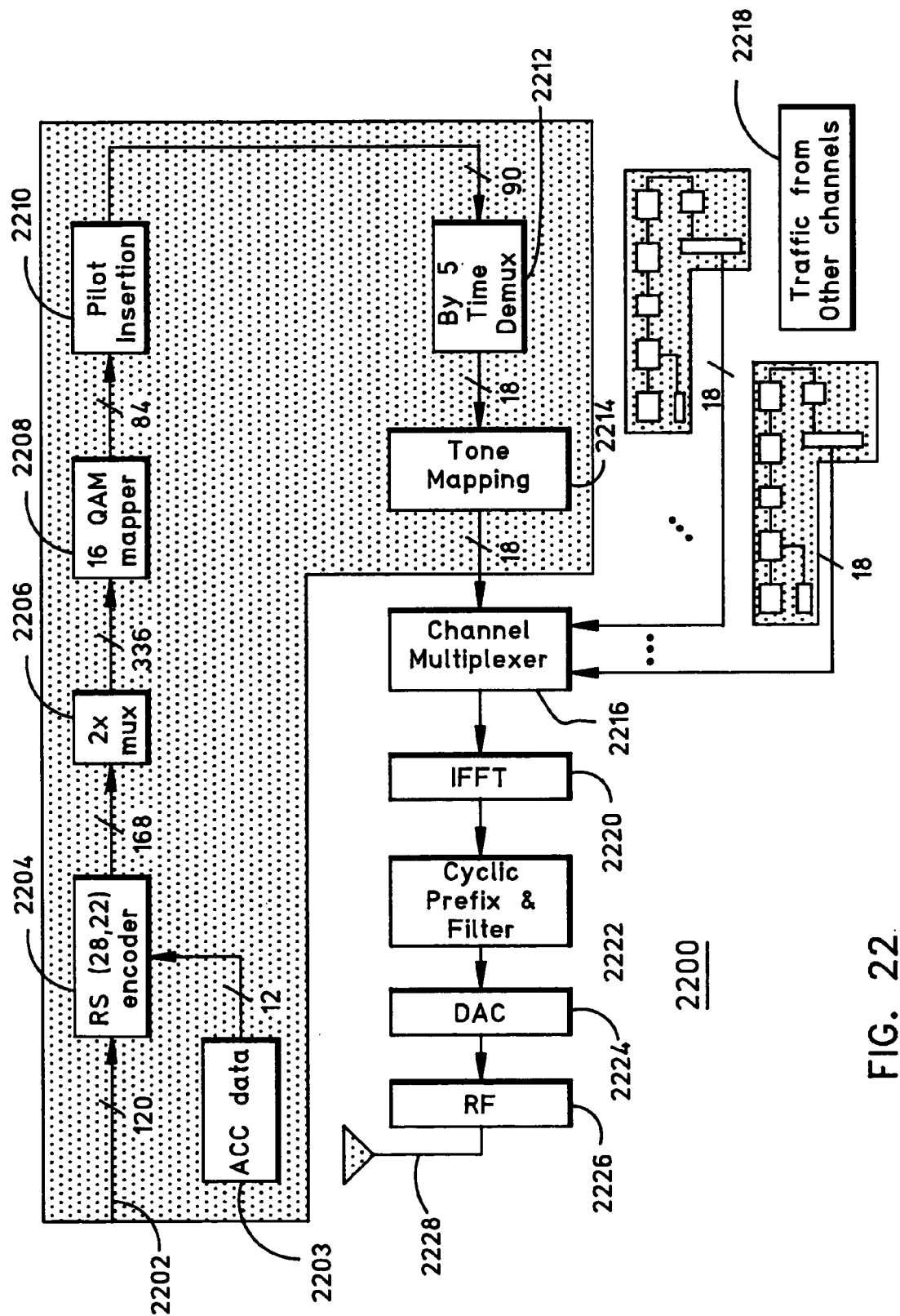
FIG. 22 is a functional block diagram of a base transmitter for use in transmitting voice data in the fixed wireless system.

FIG. 22 shows a functional block diagram of a base transmitter 2200 for PWAN 16 Kbps voice channels in 16 QAM mode during steady state operation. Transmitter 2200 of FIG. 22 should not be misconstrued as being the only implementation possible. For example, some of the functions shown as serial operations in the diagram may be done in parallel. 16 Kbps data 2202 and ACC data 2203 are fed into transmitter 2200, which includes an RS encoder 2204, a multiplexer 2206, a 16 QAM mapper 2208, a pilot inserter 2210, a demultiplexer 2212, a tone mapper 2214, a channel multiplexer 2216 coupled to traffic from other channels 2218, an IFFT processor 2220, a cyclic prefix and filter 2222, a DAC 2224, an RF stage 2226, and an antenna 2228.

Figure 23A:
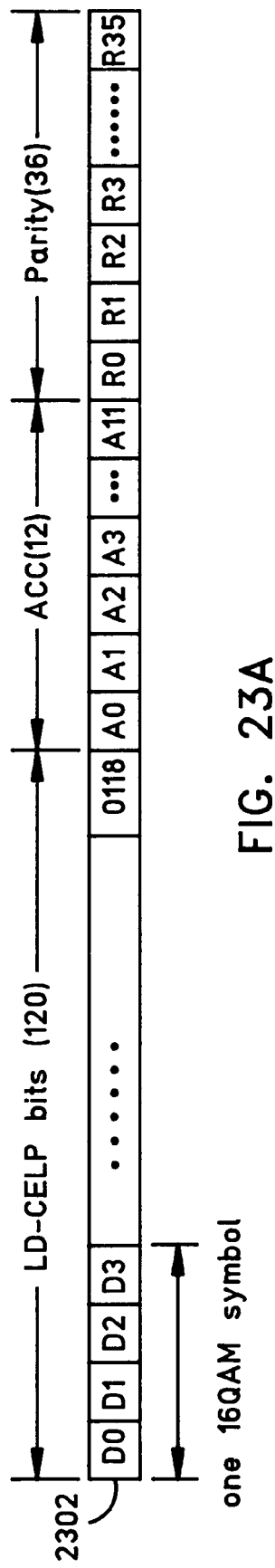
FIGS. 23A and 23B are Reed Solomon (RS) encoded data, for voice and high speed data, respectively.

The 16 QAM mode employs one frequency division multiple access (FDMA) slot (18 tones), one TDMA slot per TDMA frame to carry 16 Kbps of source encoded speech bits 2202, and 1.6 Kbps of raw ACC bits 2203. The description in the block diagram of FIG. 22 is specifically for (1) 240 LD-CELP and 24 ACC bits; (2) carried within two RS blocks; each RS block contains 120 LD-CELP bits, 12 ACC bits, and 36 RS parity bits; (3) 15 millisecond (msec) transmission time; i.e., five TDMA slots in five TDMA frames; (4) one FDMA slot (or 18 tones) assigned; and (5) six pilot symbols within the 15 msec transmission. The LD-CELP encoder provides 120 bits, and the ACC provides 12 bits, every 7.5 msec. The 132 bits are RS-encoded using a shortened RS (28,22) code in GF(64) where each RS symbol is six bits long. The output of the encoder is 168 bits. The structure of a single RS block 2302 is shown in FIG. 23A. This process is repeated for another 132 bits of data to generate another 168 bits (shown by the ×2 multiplexer). The 336 bits are mapped to 84 16 QAM symbols; i.e., each 16 QAM symbol represents four bits. Six pilot symbols are then added to generate 90 symbols. The 90 symbols are demultiplexed over five TDMA slots. The 18 symbols in each TDMA slot are mapped onto 18 tones; i.e., placed in the appropriate frequency bins corresponding to the assigned FDMA slot.

Figure 24:
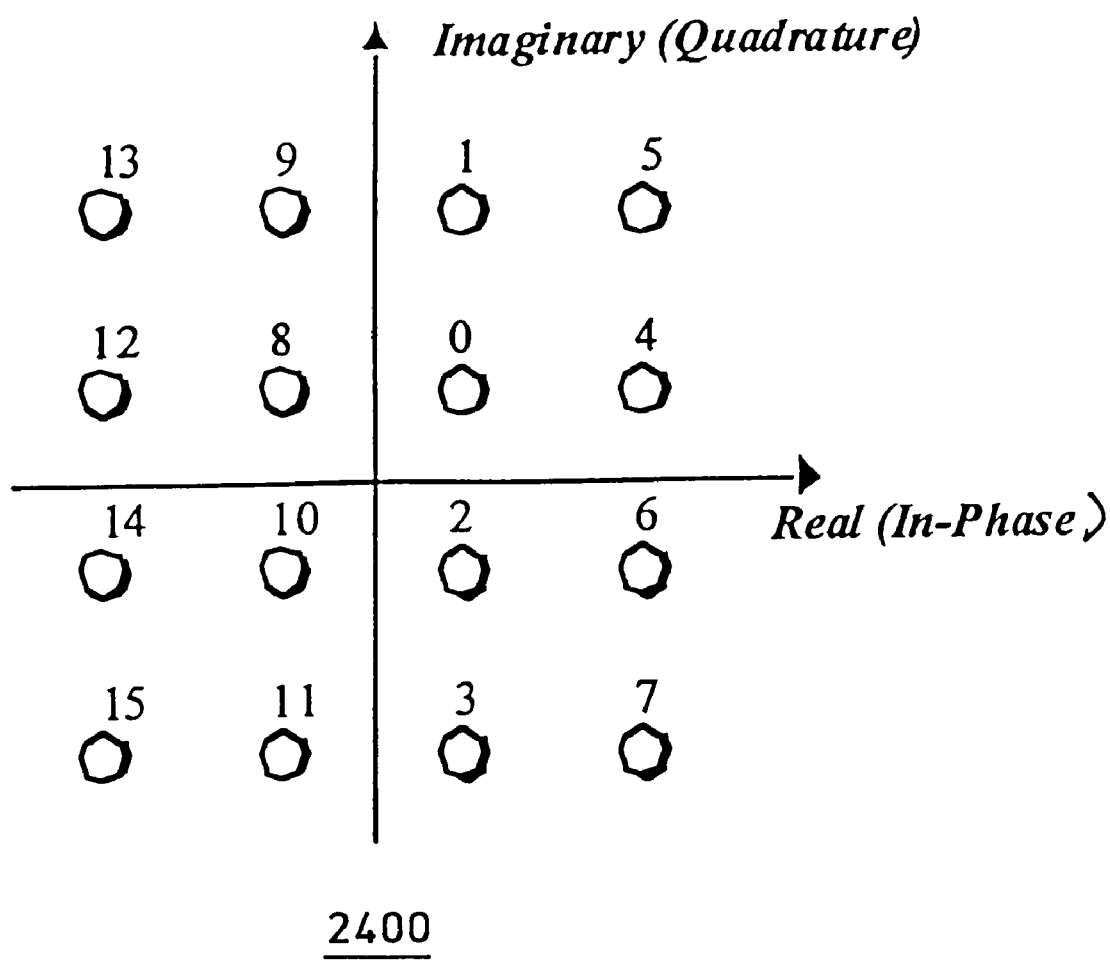
FIG. 24 is an illustration of a 16 Quadrature Amplitude Modulation (QAM) constellation.

In FIG. 24, a 16 QAM constellation 2400 which is Gray coded is shown. Table 1 below shows the in-phase and quadrature constellation symbol values which are chosen to achieve an average energy of one for the entire 16 QAM constellation.

TABLE 1

Signal Mappings for 16 QAM

| Symbol | In-phase | Quadrature |
|--------|----------|------------|
| 0  | $1/\sqrt{10}$  | $1/\sqrt{10}$  |
| 1  | $1/\sqrt{10}$  | $3/\sqrt{10}$  |
| 2  | $1/\sqrt{10}$  | $-1/\sqrt{10}$ |
| 3  | $1/\sqrt{10}$  | $-3/\sqrt{10}$ |
| 4  | $3/\sqrt{10}$  | $3/\sqrt{10}$  |
| 5  | $3/\sqrt{10}$  | $3/\sqrt{10}$  |
| 6  | $3/\sqrt{10}$  | $-1/\sqrt{10}$ |
| 7  | $3/\sqrt{10}$  | $-3/\sqrt{10}$ |
| 8  | $-1/\sqrt{10}$ | $1/\sqrt{10}$  |
| 9  | $-1/\sqrt{10}$ | $3/\sqrt{10}$  |
| 10 | $-1/\sqrt{10}$ | $-1/\sqrt{10}$ |
| 11 | $-1/\sqrt{10}$ | $-3/\sqrt{10}$ |
| 12 | $-3/\sqrt{10}$ | $1/\sqrt{10}$  |
| 13 | $-3/\sqrt{10}$ | $3/\sqrt{10}$  |
| 14 | $-3/\sqrt{10}$ | $-1/\sqrt{10}$ |
| 15 | $-3/\sqrt{10}$ | $-3/\sqrt{10}$ |

Referring back to FIG. 22, the tones from all the active channels in the (1 MHz) subband are multiplexed and sent for IFFT operation. The IFFT operation is carried out to convert the signals into time domain. A cyclic prefix is added to the time domain samples, and appropriate conventional filtering is performed. The digital samples are converted to analog, RF converted, and sent for transmission over the corresponding antenna. As described, there are a total of 18 frequency tones in one FDMA slot (0–17). A tone may carry one pilot symbol, or four bits of information within a 16 QAM signal constellation. The 16 QAM constellation is Gray coded and identical to that shown in FIG. 24 for the link maintenance pilots (LMP). The points on the constellation have been chosen so that the average energy of the signal is one.

Table 2 below shows symbol mapping onto these tones. A tone may carry one pilot symbol, or four bits of information within a 16 QAM signal constellation. The integer number with prefix D represent LD-CELP bits (D0–D239), numbers with prefix R represent RS parity bits (R0–R71), those with prefix P denote pilot symbols (P0–P11), and those with prefix A denote ACC bits (A0–A23).

TABLE 2

Mapping Bits and Pilot Symbols onto Tones for 16 QAM Voice

| Tone | TDMA Slot 0 | TDMA Slot 1 | TDMA Slot 2 | TDMA Slot 3 | TDMA Slot 4 |
|---|---|---|---|---|---|
| 0 | D0–D3 | D64–D67 | R0–R3 | D152–D155 | D220–D223 |
| 1 | D4–D7 | D68–D71 | R4–R7 | D156–D159 | D224–D227 |
| 2 | D8–D11 | D72–D75 | R8–R11 | D160–D163 | D228–D231 |
| 3 | D12–D15 | D76–D79 | R12–R15 | D164–D167 | D232–13235 |
| 4 | D16–D19 | D80–D83 | R16–R19 | D168–D171 | D236–D239 |
| 5 | P0 | D84–D87 | R20–R23 | D172–D176 | R36–R39 |
| 6 | D20–D23 | D88–D91 | R24–R27 | D176–D179 | R40–R43 |
| 7 | D24–D27 | D92–1395 | R28–R31 | D150–D183 | R44–R47 |
| 8 | D28–D31 | P2 | P3 | P4 | P5 |
| 9 | D32–D35 | D96–D99 | R32–R35 | D184–D187 | A12–A15 |
| 10 | 1336–1339 | D100–D103 | D120–D123 | D188–D191 | A16–A19 |
| 11 | D40–D43 | D104–D107 | D124–D127 | D192–D195 | A20–A23 |
| 12 | D44–D47 | D105–D111 | D128–D131 | D196–D199 | R48–R51 |
| 13 | P1 | D112–D115 | D132–D135 | D200–D203 | R52–R55 |
| 14 | D48–D51 | D116–D119 | D136–D139 | D204–D207 | R56–R59 |
| 15 | D52–D55 | A0–A3 | D140–D143 | D208–D211 | R60–R63 |
| 16 | D56–D59 | A4–A7 | D144–D147 | D212–D215 | R64–1167 |
| 17 | D60–D63 | A8–A11 | D148–D151 | D216–D219 | R68–R71 |

RS Encoding for 16 QAM Voice. For voice in 16 QAM mode, the RS code is an RS (63,57) code shortened to RS (28,22). The generator polynomial for the code is constructed using the following expression:

$$g(x) = \prod_{j=1}^{6}(x - a^j)$$

where α is a primitive element of the Galois field GF($2^6$) with the primitive polynomial p(x)=1+x+$x^6$.

Constellation Mapping. The constellation for the 16 QAM voice tones is Gray coded as shown in FIG. 24. The mapping of the six pilot symbols to the 16 QAM constellation is shown in Table 3 below.

TABLE 3

Pilot Symbol Mapping for 16 QAM Voice

| Pilot | P0 | P1 | P2 | P3 | P4 | P5 |
|---|---|---|---|---|---|---|
| Constellation | 7 | 7 | 7 | 7 | 7 | 7 |

High-Speed Data Traffic Channel Coding and Modulation. The data channel in 16 QAM mode provides 18 Kbps of data using one FDMA slot (18 tones) and one TDMA slot per TDMA frame. Using multiple numbers of FTRs, integer multiples of 18 Kbps may be obtained. For example, using four FTRs via two FDMA slots and two TDMA slots (per frame), 72 Kbps may be obtained; and using 16 FTRs via eight FDMA slots and two TDMA slots per frame, 288 Kbps may be supported.

Figure 25:
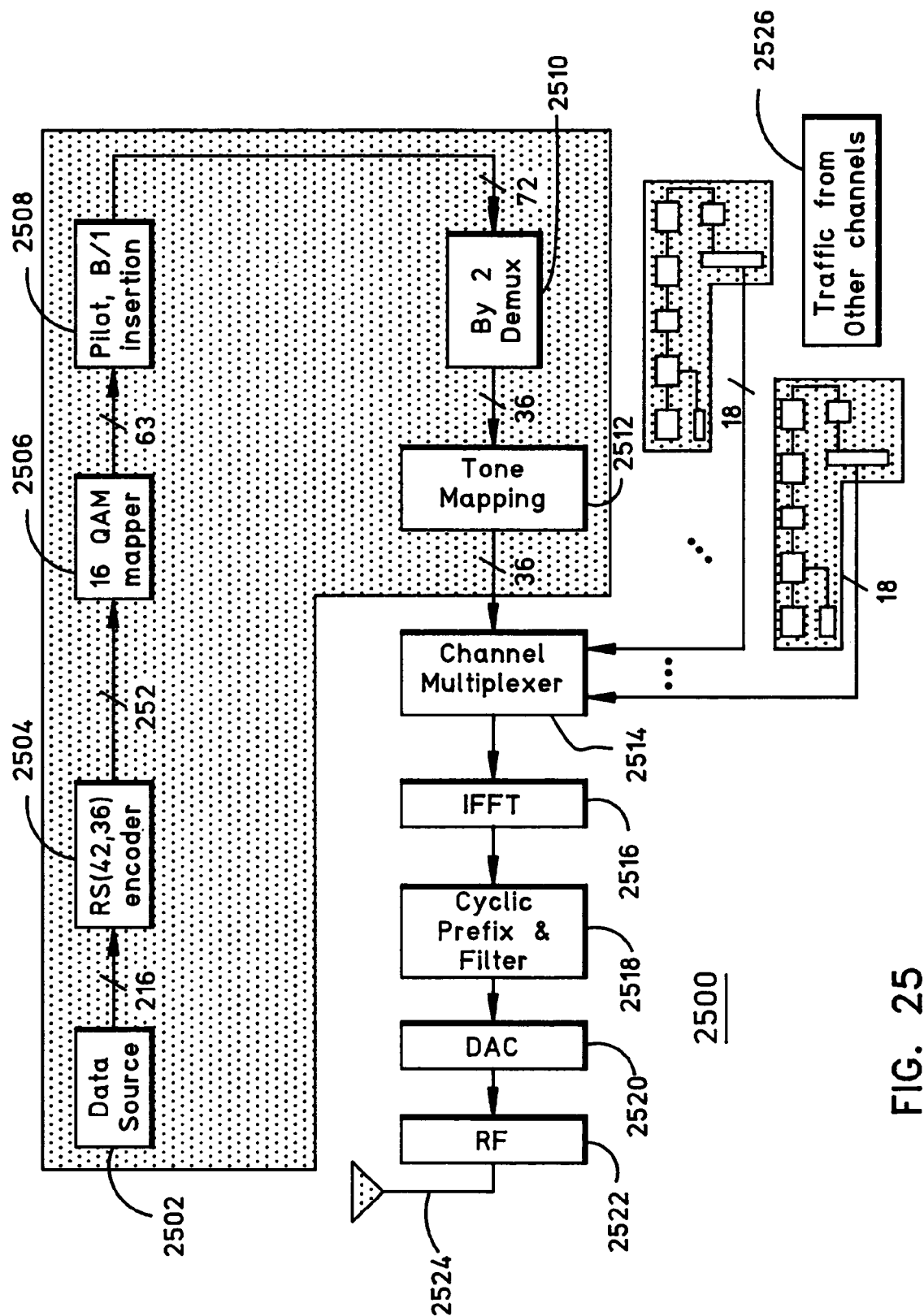
FIG. 25 is a functional block diagram of a base transmitter for use in transmitting high speed data in the fixed wireless system.

FIG. 25 shows the functional block diagram of a base transmitter 2500 for the PWAN data channels in 16 QAM mode during steady state operation. The description in the block diagram is for (1) 72 Kbps (two FDMA slots, two TDMA slots per frame) 216 bits of data; (2) carried within one RS block; each RS block contains 216 bits of data and 36 RS parity bits; (3) 3 msec transmission time; i.e., four FTRs in one TDMA frame; and (4) nine pilot symbols (8+B/I–DS flag) within the 3 msec transmission time. High speed data 2502 are fed into transmitter 2500, which includes an RS encoder 2504, a 16 QAM mapper 2506, a pilot inserter 2508, a demultiplexer 2510, a tone mapper 2512, a channel multiplexer 2514 coupled to traffic from other channels 2526, an IFFT processor 2516, a cyclic prefix and filter 2518, a DAC 2520, an RF stage 2522, and an antenna 2524.

Figure 23B:
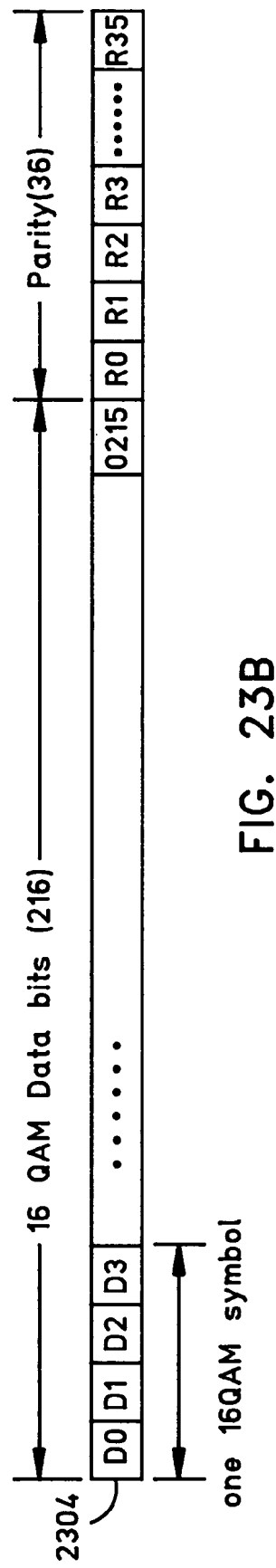

The data source provides 216 bits every 3 msec. The 216 bits are RS-encoded using a shortened RS (42,36) code in GF (64) where each RS symbol is six bits long. The output of the encoder is 252 bits. The structure of a single RS block 2304 is shown in FIG. 23B. The 252 bits are mapped to 63 16 QAM symbols; i.e., each 16 QAM symbol represents four bits. Nine pilot symbols are then added to generate 72 symbols. The 72 symbols are demultiplexed over four FTRs within the TDMA frame. The 18 symbols in each FTR are mapped onto 18 tones; i.e., placed in the appropriate frequency bins corresponding to the assigned FDMA slot.

The tones from all the active channels in the (1 MHz) subband are multiplexed and sent for IFFT operation. The IFFT operation is carried out to convert the signals into time domain. A cyclic prefix is added to the time domain samples, and appropriate filtering is performed. The digital samples are converted to analog, RF converted and sent for transmission over the corresponding antenna. The 16 QAM constellation for the data mode is gray coded as shown in FIG. 24. For data in 16 QAM mode, an RS (63,57) code is shortened to RS (42,36). Also, the generator polynomial for the code is identical to the 16 QAM channels as described earlier. As described previously, there are a total of 18 frequency tones in one FDMA slot (0–17). Table 4 below shows mapping symbols onto these tones. A tone may carry one pilot symbol, or four bits of information within a 16 QAM signal constellation.

TABLE 4

Mapping Bits and Pilot Symbols onto Tones for 16 QAM Data

| Tone | FTR 0 | FTR 1 | FTR 2 | FTR 3 |
|---|---|---|---|---|
| 0 | D0–D3 | D60–D63 | D124–D127 | D188–D191 |
| 1 | D4–D7 | D64–D67 | D128–D131 | D192–D195 |
| 2 | D8–D11 | D68–D71 | D132–D135 | D196–D199 |
| 3 | D12–D15 | D72–D75 | D136–D139 | D200–D203 |
| 4 | D16–D19 | D76–D79 | D140–D143 | D204–D207 |

TABLE 4-continued

Mapping Bits and Pilot Symbols onto Tones for 16 QAM Data

| Tone | FTR 0 | FTR 1 | FTR 2 | FTR 3 |
|------|-------|-------|-------|-------|
| 5 | P0 | P2 | P4 | P6 |
| 6 | D20–D23 | D80–D83 | D144–D147 | D208–D211 |
| 7 | D24–D27 | D84–D87 | D148–D151 | D212–D215 |
| 8 | BIDS | D88–D91 | D152–D155 | R0–R3 |
| 9 | D28–D31 | D92–D95 | D156–D159 | R4–R7 |
| 10 | D32–D35 | D96–D99 | D160–D163 | R8–R11 |
| 11 | D36–D39 | D100–D103 | D164–D167 | R12–R15 |
| 12 | D40–D43 | D104–D107 | D168–D171 | R16–R19 |
| 13 | P1 | P3 | P5 | P7 |
| 14 | D44–D47 | D108–D111 | D172–D176 | R20–R23 |
| 15 | D48–D51 | D112–D115 | D176–D179 | R24–R27 |
| 16 | D52–D55 | D116–D119 | D180–D183 | R28–R31 |
| 17 | D56–D59 | D120–D123 | D184–D187 | R32–R35 |

The following description specifies the software design for the Associated Control Channel (ACC) of the physical layer. The ACC currently encompasses three message types, the Link Control Channel (LCC), Telephony Control Channel (TCC) and the Physical Control Channel (PCC). The Airlink DSP (DSP1) acts as a router where the LCC's client is the control CPU, the PCC's client is the Physical Management Entity and the TCC's client is the Telephony DSP (DSP2). Control and routing of these messages is done by the ACC Management Entity (AME). The ACC message itself is transferred/received to/from the traffic processing module. The transfer of bits which comprise the LCC, PCC, and the TCC messages are now described.

Figure 26:
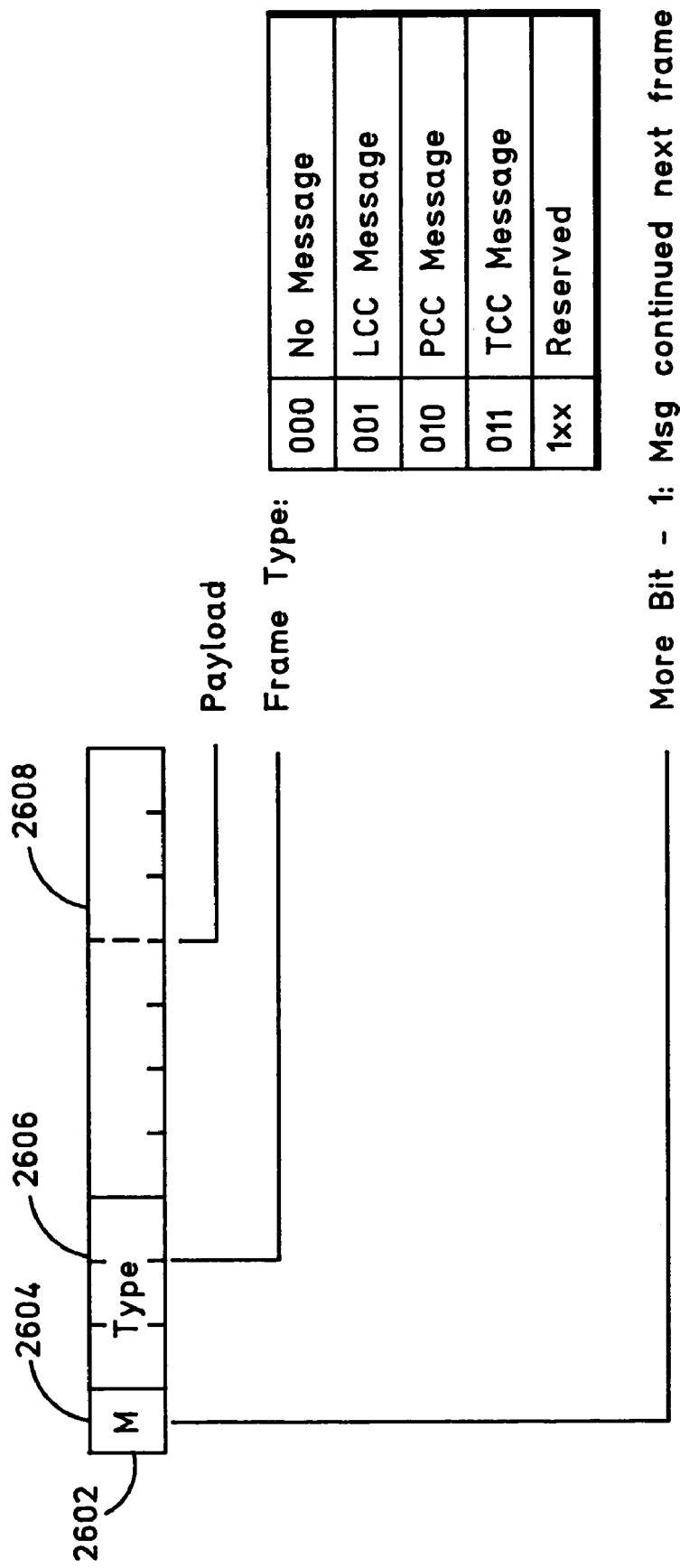
FIG. 26 is an illustrative representation of an Associated Control Channel (ACC) message format.

ACC Message Format. Each ACC frame consists of a 4-bit header and 8-bit payload section. A format 2602 of the ACC bits is illustrated in FIG. 26. Regarding the "More Bit" 2604, when this bit is set it signifies that the next frame contains more data for the current ACC message. When this bit is cleared, then the current frame is the last frame. Regarding the "Frame Type" 2606, these three bits represent the type of ACC frame (LCC, TCC or PCC). Each ACC frame transmitted contains this 4-bit header so that multi-frame messages can be superseded by higher priority messages. This is necessary for TCC data since the actual data for the TCC is contained in one of the three 40-bit sub-frames of the traffic data and so the message cannot be held off. The frame type currently defines four values, No Message, LCC, TCC and PCC messages. When there is no ACC traffic, the frame type is set to a 00 (No Message). While ACC data exists on the channel, the frame type corresponds to the message type LCC, TCC or PCC. There are four reserved message types which may be used to implement a fast channel type message, which may use the 120 bits of payload, if the need arises. Regarding the "payload" 2608, eight bits of payload are available for each ACC frame. For LCC and PCC messages the AME just routes the payload to/from the destination, source. The payload in a TCC message determines which of the three 40-bit frames received/transferred contain TCC messages.

The following description is of the ACC Management Entity (AME) which handles all routing and formatting needed. The AME serves two purposes: it acts as a router for the ACC messages and also acts as the bridging mechanism between the 2.5 msec LD-CELP timing and the 3 msec Airlink timing. More particularly, the AME is responsible for the interpretation of the frame headers and routing of messages. When processing LCC messages from the control processor, the AME takes care of any segmentation of messages greater than 8 bits for multi-frame transmission. Consequently, any multiframe message is reassembled by the AME before being delivered to the control processor. The AME interfaces to the Telephony DSP, acting as the "translator" between the 2.5 msec and 3 msec timing for the traffic data. It assembles the 120 bits and places the ACC bits onto the message and hands the message off to the traffic processing task. When receiving messages, the traffic processing task delivers the 132 bit frame to the AME which then processes the ACC bits and packetizes the traffic for the Telephony DSP. PCC messages received over the ACC are routed to the PME on the RU and transmitted over the ACC from the base. These messages may include power control and delay compensation.

LD-CELP to Airlink Timing. An LD-CELP frame consists of 40 bits of voice data while an airlink frame consists of 120 bits of voice data plus 12 bits of ACC data. LD-CELP frames arrive at the AME every 2.5 msec, while the airlink frames arrive every 7.5 msec. The limiting factor is the Telephony interface; therefore all messaging is based on its timing. Traffic processing can operate on 40 bits at a time when transmitting data; this means the AME does not have to wait until 120 bits are received from the Telephony interface before sending them on to be processed by traffic. However, the traffic processing must operate on a complete Reed Solomon block and so the AME receives 132 bits at a time from the traffic module.

Figure 27:
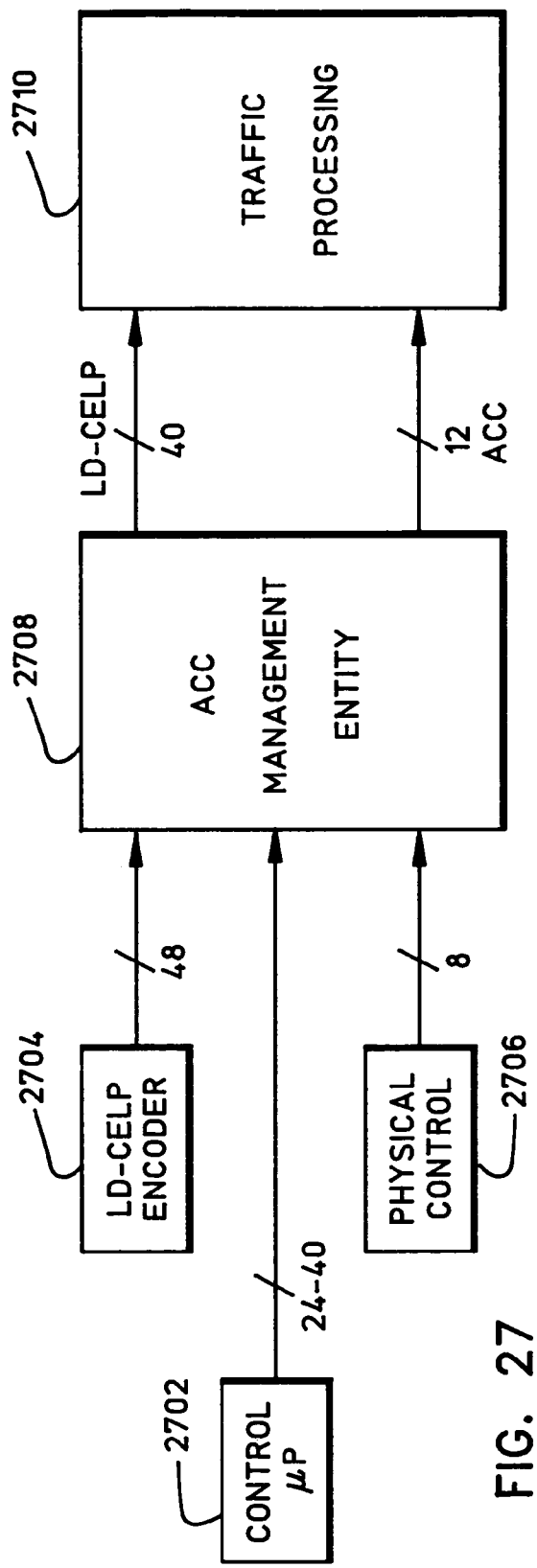
FIG. 27 is an illustrative representation of the ACC message flow for transmission in the fixed wireless system.
Figure 28:
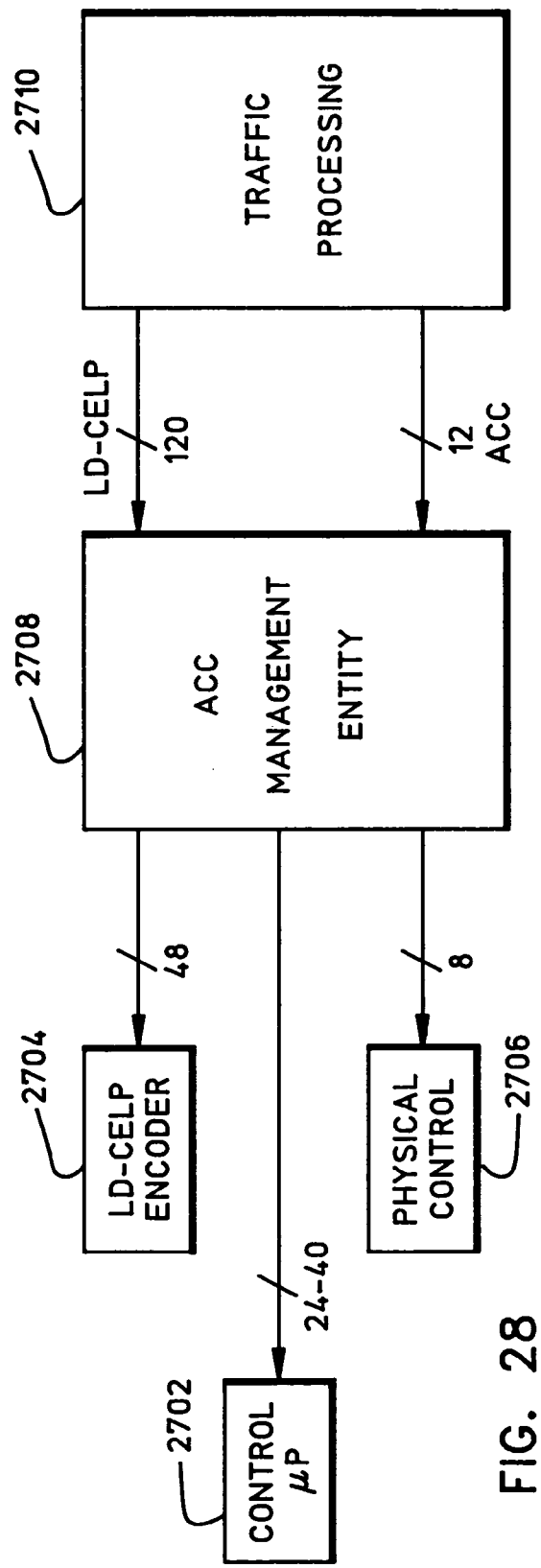
FIG. 28 is an illustrative representation of the ACC message flow for reception in the fixed wireless system.

FIG. 27 illustrates the ACC message flow for transmit, while FIG. 28 illustrates the ACC message flow for reception. In FIGS. 27 and 28, the message flow is performed in connection with a controller 2702, an LD-CELP encoder 2704, physical control 2706, an AME 2708, and a traffic processor 2710. With respect to ACC message transmission, the 2.5 msec timing is based on the TDM bus between the Airlink and Telephony DSP. Every 2.5 msec, the AME 2708 is scheduled to run, at which time the 40 bits of LD-CELP data is sent to traffic processor 2710. Since a complete airlink frame consists of 120 bits worth of LD-CELP data and 12 bits of ACC data, AME 2708 must send three 40 bit data packets for every ACC packet. This requires that AME 2708 keep a packet count. The packet alignment is arbitrary and can be defined by AME 2708; it is only needed to coordinate the sending of the ACC message between AME 2708 and traffic processor 2710. FIG. 28 illustrates the ACC message flow for reception. When traffic processor 2710 has decoded the 132 bits of an airlink frame, AME 2708 is scheduled to run. It takes the 132 bit message, processes the 12 ACC bits, and then buffers up the other 120 bits as LD-CELP data for transmission to the Telephony DSP; Data to the Telephony module is transmitted on the 2.5 msec timing boundary.

LCC Message Flow (Single Frame Messaging). If the AME detects an LCC message has been received from the traffic processor and the more bit is not set (assuming an LCC message was not already in process), then the LCC is fully contained in the payload section of the ACC and can be immediately transferred to the CPU. A sixteen bit header is attached to the payload and the message then transferred to the CPU via the Host Port I/F. At the end of each traffic frame (every 3rd transmit period), the AME checks to see if a new LCC message has been posted from the CPU (assuming an LCC message was not currently in progress). If no other ACC type messages are pending, then the ACC is loaded up with the current LCC message and sent on to the traffic processor.

LCC Message Flow (Multi-Frame Messaging). If the more bit in the ACC header is set, it means that this message is a multi-frame message. On the receive side, the AME must wait till the more bit is zero until a complete message has been transferred. A higher priority message (a TCC message) can be interleaved with a multi-frame message. The AME calculates the message length by counting the number of frames of data, then places this number in the header transmission to the CPU. Transmission of a multi-frame message is identical to that of a single frame transfer, with the exception that the more bit is set in the header up until the next to the last frame. As currently defined, only the LCC consists of multiple frame messages.

Figure 29:
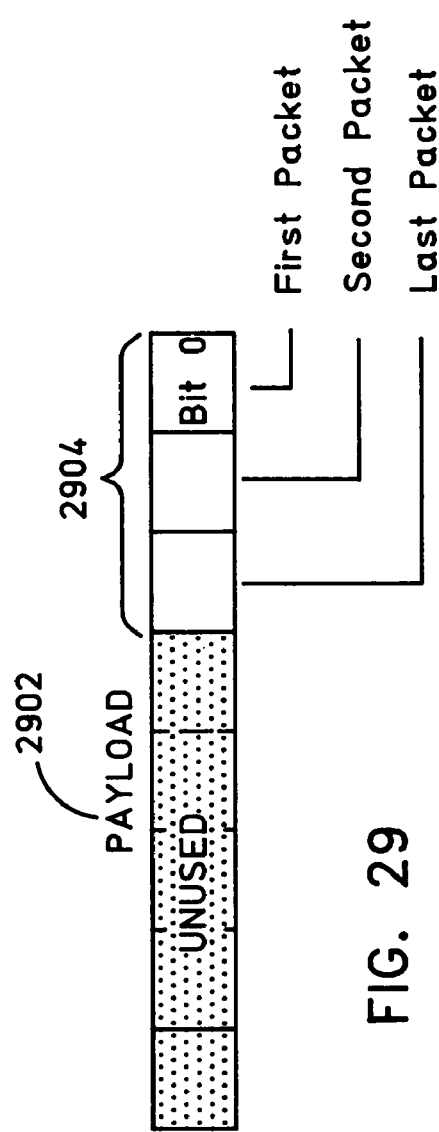
FIG. 29 is an illustrative representation of a payload for a Telephony Control Channel (TCC) message.

TCC Message Flow. Any frame from the Telephony DSP may be a TCC frame. The payload portion of a TCC message is therefore used to flag which of the three LD-CELP packets in an airlink frame contain TCC data. See FIG. 29. The first three bits 2904 in a payload 2902 act as a bit map of the valid TCC packets. The TCC has priority over both the LCC and the PCC because the TCC data is embedded in the data portion of the message. Therefore, if a multi-frame LCC is being transmitted and a TCC comes along then the TCC message is interleaved with the LCC message.

PCC Message Flow. The PCC frame format is similar to the LCC format except it is not currently defined to have more than one frame worth of data. The PCC is a control channel from the base to the RU. On the base the PCC Management Entity (PME) determines what control is needed and queues the message to the AME. The RU then routes the message to the PME for processing. Its contents are TBD pending on the requirement of Airlink physical layer applications.

Figure 30:
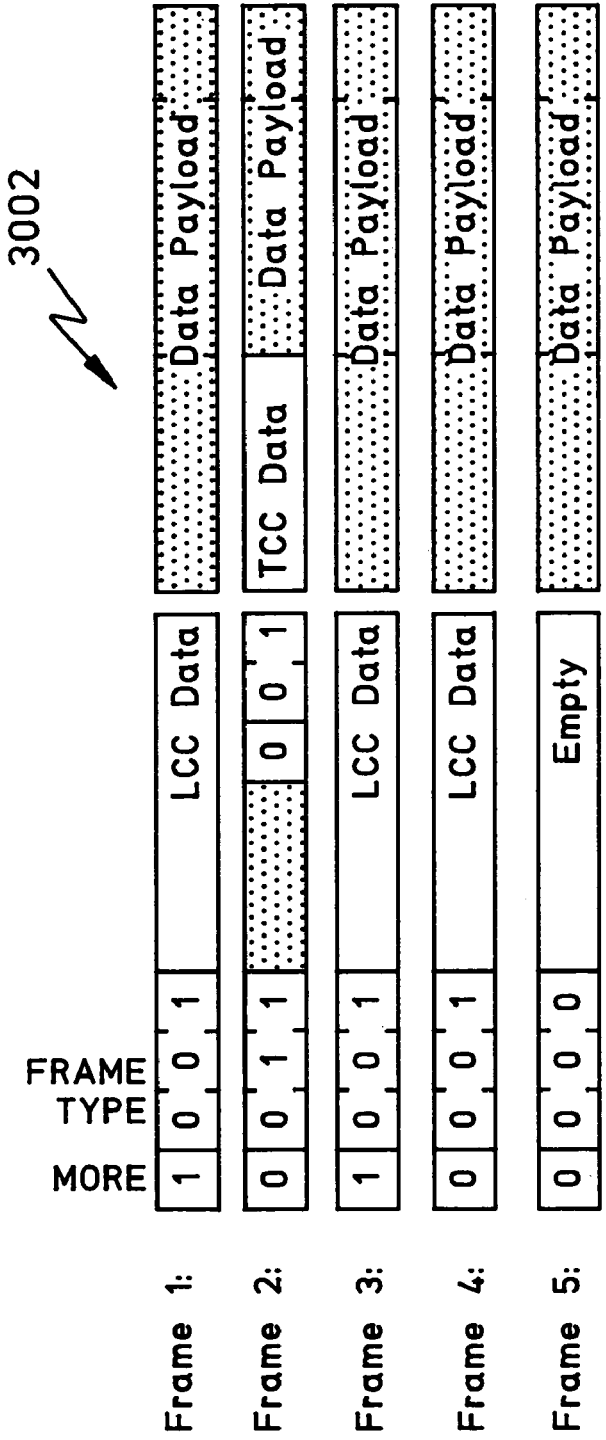
FIG. 30 is an illustration for showing the message sequencing when a TCC message needs to be sent during a multi-frame message.

Multi-Frame Messaging with TCC Transfer. FIG. 30 illustrates message sequencing 3002 when a TCC message needs to be sent during a multi-frame message. Currently, only the LCC has messages long enough to require multiple frames for transfer. This causes a one frame delay of the LCC data. But the TCC message can not be held off a frame so the LCC suffers. The chances of these messages occurring simultaneously is slim due to the sequencing of the messages.

Thus, a wireless communication system that is spectrally efficient and responsive to communications involving voice and/or high speed data, such as Internet data, has been described. The system preferably utilizes OFDM or OFDM-like communication techniques and defines each one of a plurality of traffic channels by a unique combination of frequency and time slots. The traffic channels may be voice traffic channels or data traffic channels. Each voice traffic channel is assignable to a voice communication call for carrying voice data and remains dedicated to the call, preferably throughout the entire duration of the call. This channel may be referred to as a "circuit-switched" type channel. On the other hand, each data traffic channel is used for carrying high speed data in addressed data packets. This channel may be referred to as a "packet-switched" type communication.

An inventive method of receiving data in a wireless communication system includes the steps of receiving RF OFDM communication signals over a voice traffic channel that is dedicated to a voice communication call, the voice traffic channel identifiable by a unique frequency/time slot combination; downconverting the RF OFDM communication signals for producing downconverted OFDM communication signals; sampling the downconverted OFDM communication signals for producing OFDM communication signal samples; for each frequency/time slot combination associated with the voice traffic channel: applying a Fast Fourier Transform (FFT) to the OFDM communication signal samples for producing a plurality of modulated tones; and demodulating the plurality of modulated tones for producing voice data of the voice communication call. This method includes the further steps of receiving RF OFDM communication signals over a data traffic channel, the data traffic channel identifiable by a unique frequency/time slot combination; for each frequency/time slot combination associated with the data traffic channel: applying an FFT to the OFDM communication signal samples for producing a plurality of modulated tones; and demodulating the plurality of modulated tones for producing high speed data in addressed data packets.

For each addressed data packet, the method includes the further steps of comparing a destination address of the addressed data packet with a predetermined address; accepting the addressed data packet if a match exists between the destination address and the predetermined address; and discarding the addressed data packet if the destination address and the predetermined address do not match. The step of demodulating the plurality of modulated tones includes producing encoded and compressed data for each one of the plurality of modulated tones. The method includes the further steps of decoding the encoded and compressed data for producing compressed data, and decompressing the compressed data for producing the voice data of the voice communication call.

Another inventive method of transmitting data in a wireless communication system includes the steps of, for each frequency/time slot combination associated with a voice traffic channel: modulating a plurality of tones with voice data of a voice communication call that is assigned to the voice traffic channel; applying an IFFT to the plurality of modulated tones for producing OFDM communication signal samples; and converting the OFDM communication signal samples to OFDM communication signals. This method includes the further steps of upconverting the OFDM communication signals for producing RF OFDM communication signals; and transmitting the RF OFDM communication signals over the voice traffic channel. In addition, the method includes the further steps of, for each frequency/time slot combination associated with a data traffic channel: modulating a plurality of tones with high speed data in addressed data packets; applying an IFFT to the plurality of tones for producing OFDM communication signal samples; and converting the OFDM communication signal samples to OFDM communication signals. This extended method includes the further steps of upconverting the OFDM communication signals for producing RF OFDM communication signals; and transmitting the RF OFDM communication signals over the data traffic channel. The step of modulating includes the further step of modulating a phase and amplitude of each one of the plurality of modulated tones. This method of transmitting includes the further steps of compressing the voice data for producing compressed voice data, and encoding the compressed voice data for producing encoded and compressed voice data.

A wireless receiver of the present invention includes a receiver front end, an RF downconverter, an ADC, an FFT processor, and a demodulator. The receiver front end is operative to receive RF OFDM communication signals over a voice traffic channel that is dedicated to a voice communication call, where the voice traffic channel is identifiable by a unique frequency/time slot combination. The RF downconverter is operative to downconvert the RF OFDM communication signals for producing downconverted OFDM communication signals. The ADC is operative to convert the downconverted OFDM communication signals into OFDM communication signal samples. The FFT processor is operative to apply an FFT to the OFDM communication signal samples for producing a plurality of modulated tones for each frequency/time slot combination associated with the voice traffic channel. The demodulator is operative to demodulate the plurality of modulated tones for each frequency/time slot combination associated with the voice traffic channel for producing voice data of the voice communication call. The receiver front end is further operative to receive RF OFDM communication signals over a data traffic channel, where the data traffic channel identifiable by a unique frequency/time slot combination. The FFT processor is further operative to apply an FFT to the OFDM communication signal samples for producing a plurality of modulated tones for each frequency/time slot combination associated with the data traffic channel. The demodulator is further operative to demodulate the plurality of modulated tones for each frequency/time slot combination associated with the data traffic channel for producing the high speed data in addressed data packets.

The wireless receiver further includes a processor that is operate to compare a destination address of the addressed data packet with a predetermined address, to accept the addressed data packet if a match exists between the destination address and the predetermined address, and to discard the addressed data packet if the destination address and the predetermined address do not match. The demodulator is further operative for producing encoded and compressed data for each one of the plurality of modulated tones. The wireless receiver further includes a decoder and a decompressor. The decoder is operative to decode the encoded and compressed data for producing compressed data, and the decompressor is operative to decompress the compressed data for producing the voice data.

On the other hand, a wireless transmitter of the present invention includes a modulator, an IFFT, an RF upconverter, and a transmitter front end. The modulator is operative to modulate a plurality of tones with voice data of a voice communication call for each frequency/time slot combination associated with a voice traffic channel that is assigned to the voice communication call. The IFFT processor is operative to apply an IFFT to the plurality of tones for each frequency/time slot combination associated with the voice traffic channel for producing OFDM communication signal samples. The DAC is operative to convert the OFDM communication signal samples into OFDM communication signals. The RF upconverter is operative to upconvert the OFDM communication signals for producing RF OFDM communication signals. The transmitter front end is operative to transmit the RF OFDM communication signals over the voice traffic channel. The modulator is further operative to modulate a plurality of tones with high speed data for each frequency/time slot combination associated with a data traffic channel, where the high speed data is carried in addressed data packets. The IFFT processor is further operative to apply an IFFT to the plurality of tones for each frequency/time slot combination associated with the data traffic channel for producing OFDM communication signal samples. The transmitter front end is further operative to transmit the RF OFDM communication signals over the data traffic channel. The modulator is preferably a phase and amplitude modulator. The wireless transmitter further includes a vocoder and a block encoder. The vocoder is operative to compress the voice data for producing compressed voice data, and the block encoder is operative to encode the compressed voice data for producing encoded and compressed voice data.

Steps of another inventive method for communicating data in a wireless OFDM communication system include providing a plurality of wireless voice traffic channels for carrying voice data, and providing a plurality of wireless data traffic channels for carrying high speed data in addressed data packets. Each wireless data and voice traffic channel is identifiable by a unique combination of frequency and time slots. Each wireless voice traffic channel is assignable to a voice communication call for carrying voice data of the voice communication call. Preferably, each wireless voice traffic channel is dedicated to a voice communication call upon being assigned.

Finally, according to another aspect of the present invention, a fixed wireless system utilizing OFDM techniques includes a wireless base unit; a plurality of fixed wireless remote units; a plurality of wireless voice traffic channels assignable between the wireless base unit and the plurality of fixed wireless remote units; and a plurality of wireless data traffic channels assignable between the wireless base unit and the plurality of fixed wireless remote units. Each wireless traffic channel is identifiable by a unique combination of frequency and time slots. Each wireless data traffic channel is used for carrying high speed data in addressed data packets to and from the plurality of fixed wireless remote units. On the other hand, each wireless voice traffic channel is assignable to a voice communication call involving one of the plurality of fixed wireless remote units for carrying voice data of the voice communication call. Preferably, each wireless voice traffic channel is dedicated to a voice communication call upon being assigned.

It should be readily apparent and understood that the foregoing description is only illustrative of the invention and in particular provides preferred embodiments thereof. Various alternatives and modifications can be devised by those skilled in the art without departing from the true spirit and scope of the invention. Accordingly, the present invention is intended to embrace all such alternatives, modifications, and variations which fall within the scope of the appended claims.

The invention claimed is:

1. A fixed wireless system utilizing Orthogonal Frequency Division Multiplexing (OFDM) techniques, the fixed wireless system comprising:
   a wireless base unit;
   a plurality of fixed wireless remote units;
   a plurality of wireless voice traffic channels available between the wireless base unit and the plurality of fixed wireless remote units;
   a plurality of wireless data traffic channels available between the wireless base unit and the plurality of fixed wireless remote units;
   each wireless traffic channel being identifiable by a unique combination of frequency and time slots;
   each wireless data traffic channel for carrying high speed data in addressed data packets to and from the plurality of fixed wireless remote units; and
   each wireless voice traffic channel being assignable to a voice communication call involving one of the plurality of fixed wireless remote units for carrying voice data of the voice communication call, wherein each wireless voice traffic channel is deassignable during a voice communication call.

2. The fixed wireless system according to claim 1, wherein each wireless voice traffic channel is dedicated for carrying voice data of a voice communication call upon being assigned.

3. The fixed wireless system according to claim 1, wherein data in each unique combination of frequency and time slots comprises a plurality of modulated carriers.

4. A method for use in communicating data in a wireless communication system utilizing Orthogonal Frequency Division Multiplexing (OFDM) techniques, the method comprising:

provanding a plurality of wireless data traffic channels for carrying high speed data in addressed data packets, each wireless data traffic channel being identifiable by a unique combination of frequency and time slots; and providing a plurality of wireless voice traffic channels for carrying voice data, each wireless voice traffic channel being identifiable by a unique combination of frequency and time slots, each wireless voice traffic channel being assignable to a voice communication call for carrying voice data of the voice communication call, wherein providing the plurality of wireless voice traffic channels further comprises providing wireless voice traffic channels that are deassignable during a voice communication call.

5. The method according to claim 4, wherein providing the plurality of wireless voice traffic channels further comprises providing wireless voice traffic channels that are dedicated to carry voice data of a voice communication call upon being assigned.

6. The method according to claim 4, wherein providing a plurality of wireless voice and data traffic channels involves providing traffic channels that carry data on a plurality of modulated carriers for each unique combination of frequency and time slot in use.

7. A method of receiving data in a wireless communication system, the method comprising:

receiving radio frequency (RF) OFDM communication signals over a voice traffic channel that is dedicated to a voice communication call, the voice traffic channel identifiable by a unique frequency/time slot combination;

downconverting the RF OFDM communication signals for producing downconverted OFDM communication signals;

sampling the downconverted OFDM communication signals for producing OFDM communication signal samples;

for each frequency/time slot combination associated with the voice traffic channel:
applying a Fast Fourier Transform (FFT) to the OFDM communication signal samples for producing a plurality of modulated tones; and
demodulating the plurality of modulated tones for producing voice data of the voice communication call receiving RF OFDM communication signals over a data traffic channel, the data traffic channel identifiable by a unique frequency/time slot combination;

for each frequency/time slot combination associated with data traffic channel:

applying an FFT to the OFDM communication signal samples for producing a plurality of modulated tones; and demodulating the plurality of modulated tones for producing high speed data in addressed data packets.

8. The method according to claim 7, wherein demodulating the plurality of modulated tones comprises producing encoded and compressed data.

9. The method according to claim 7, wherein demodulating the plurality of modulated tones comprises producing encoded and compressed data, the method further comprising:

decoding the encoded and compressed data for producing compressed data; and decompressing the compressed data for producing the voice data of the voice communication call.

10. A method of receiving data in a wireless communication system, the method comprising:

receiving radio frequency (RF) OFDM communication signals over a voice traffic channel that is dedicated to a voice communication call, the voice traffic channel identifiable by a unique frequency/time slot combination;

downconverting the RF OFDM communication signals for producing downconverted OFDM communication signals;

sampling the downconverted OFDM communication signals for producing OFDM communication signal samples;

for each frequency/time slot combination associated with the voice traffic channel:
applying a Fast Fourier Transform (FFT) to the OFDM communication signal samples for producing a plurality of modulated tones;
demodulating the plurality of modulated tones for producing voice data of the voice communication call;

receiving RF OFDM communication signals over a data traffic channel, the data traffic channel identifiable by a unique frequency/time slot combination;

for each frequency/time slot combination associated with the data traffic channel:
applying an FFT to the OFDM communication signal samples for producing a plurality of modulated tones; and
demodulating the plurality of modulated tones for producing high speed data in addressed data packets; and repeating the following steps for each of a plurality of addressed data packets:
comparing a destination address to the addressed data packet with a predetermined address;
accepting the addressed data packet if a match exists between the destination address and the predetermined address; and
discarding the addressed data packet if the destination address and the predetermined address do not match.

11. A method of receiving data in a wireless communication system, the method comprising:

receiving radio frequency (RF) OFDM communication signals over a voice traffic channel that is dedicated to a voice communication call, the voice traffic channel identifiable by a unique frequency/time slot combination;

downconverting the RF OFDM communication signals for producing downconverted OFDM communication signals;

sampling the downconverted OFDM communication signals for producing OFDM communication signal samples; and for each frequency/time slot combination associated with the voice traffic channel:
applying a Fast Fourier Transform (FFT) to the OFDM communication signal samples for producing a plurality of modulated tones; and demodulating the plurality of modulated tones for producing voice data of the voice communication call,
wherein demodulating the plurality of modulated tones comprises producing encoded and compressed data, the method further comprising
decoding the encoded and compressed data for producing compressed data; and
decompressing the compressed data for producing the voice data of the voice communication call, and
wherein demodulating comprises demodulating involving 16-Quadrature Amplitude Modulation (QAM), wherein decoding comprises decoding involving Reed-Solomon block codes, and wherein decompressing comprises decompressing involving Code Excited Linear Predictive (CELP) decompression.

12. A method of transmitting data in a wireless communication system, comprising:
for each frequency/time slot combination associated with a voice traffic channel:
modulating a plurality of tones with voice data of a voice communication call that is assigned to the voice traffic channel;
applying and Inverse Fast Fourier Transform (IFFT) to the plurality of modulated tones for producing Orthogonal Frequency Division Multiplexed (OFDM) communication signals samples;
converting the OFDM communication signal samples to OFDM communication signals;
upconverting the OFDM communication signals for producing radio frequency (RF) OFDM communication signals; and
transmitting the RF OFDM communication signals over the voice traffic channel
for each frequency/time slot combination associated with a voice traffic channel:
modulating a plurality of tones with voice data of a voice communication call that is assigned to the voice traffic channel;
applying an Inverse Fast Fourier Transform (IFFT) to the plurality of modulated tones for producing Orthogonal Frequency Division Multiplexed (OFDM) communication signal samples;
converting the OFDM communication signal samples to OFDM communication signals;
upconverting the OFDM communication signals for producing radio frequency (RF) OFDM communication signals; and
transmitting the RF OFDM communication signals over the voice traffic channel.

13. The method according to claim 12, wherein modulation the plurality of tones comprises modulating a phase and amplitude of each one of the plurality of modulated tones.

14. The method according to claim 12, further comprising:
compressing the voice data for producing compressed voice data;
prior to compressing, encoding the compressed voice data for producing encoded and compressed voice data; and
wherein modulating the plurality of tones comprises modulating a phase and amplitude of each one of the plurality of modulated tones with the encoded and compressed voice data.

15. A method of transmitting data in a wireless communication system, comprising:
for each frequency/time slot combination associated with a voice traffic channel:
modulating a plurality of tones with voice data of a voice communication call that is assigned to the voice traffic channel;
applying and Inverse Fast Fourier Transform (IFFT) to the plurality of modulated tones for producing Orthogonal Frequency Division Multiplexed (OFDM) communication signals samples;
converting the OFDM communication signal samples to OFDM communication signals;
upconverting the OFDM communication signals for producing radio frequency (RF) OFDM communication signals;
transmitting the RF OFDM communication signals over the voice traffic channel; compressing the voice data for producing compressed voice data;
prior to compressing, encoding the compressed voice data for producing encoded and compressed voice data; and
wherein modulating the plurality of tones comprises modulating a phase and amplitude of each one of the plurality of modulated tones with the encoded and compressed voice data;
wherein modulating comprises modulating using 16-Quadrature Amplitude Modulation (QAM), wherein encoding comprises using Reed-Solomon block codes, and wherein compressing comprises using Code Excited Linear Predictive (CELP) compression.

16. A wireless receiver, comprising:
a receiver front end, said receiver front end operative to receive RF OFDM communication signals over a voice traffic channel that is dedicated to a voice communication call, the voice traffic channel identifiable by a unique frequency/time slot combination;
a radio frequency (RF) downconverter, said RF downconverter operative to downconvert the RF OFDM communication signals for producing downconverted OFDM communication signals;
an analog-to-digital converter (ADC), sand ADC operative to convert the downconverted OFDM communication signals into OFDM communication signal samples;
a Fast Fourier Transform (FFT) processor, said FFT processor operative to apply and FFT to the OFDM communication signal samples for producing a plurality of modulated tones for each frequency/time slot combination associated with the voice traffic channel; and
a demodulator, said demodulator operative to demodulate the plurality of modulated tones for each frequency/time slot combination associated with the voice traffic channel for producing voice data of the voice communication call
said receiver front end being further operative to receive RF OFDM communication signals over a data traffic channel, the data traffic channel identifiable by a unique frequency/time slot combination;
said FFT processor being further operative to apply an FFT to the RF OFDM communication signal samples for producing a plurality of modulated tones for each frequency/time slot combination associated with the data traffic channel; and
said demodulator being further operative to demodulate the plurality of modulated tones for each frequency/time slot combination associated with the data traffic channel for producing the high speed data in addressed data packets.

17. The wireless receiver according to claim 16, further comprising:
said demodulator being further operative for producing encoded and compressed data for each one of the plurality of modulated tones.

18. The wireless receiver according to claim 16, further comprising:
said demodulator being further operative for producing encoded and compressed data for each one of the plurality of modulated tones;
a decoder, said decoder operative to decode the encoded and compressed data for producing compressed data; and
a decompressor, said decompressor operative to decompress the compressed data for producing the voice data.

19. A wireless receiver, comprising:
a receiver front end, said receiver front end operative to receive RF OFDM communication signals over a voice traffic channel that is dedicated to a voice communication call, the voice traffic channel identifiable by a unique frequency/time slot combination;
a radio frequency (RF) downconverter, said RF downconverter operative to downconvert the RF OFDM communication signals for producing downconverted OFDM communication signals;
an analog-to-digital converter (ADC), sand ADC operative to convert the downconverted OFDM communication signals into OFDM communication signal samples;
a Fast Fourier Transform (FFT) processor, said FFT processor operative to apply and FFT to the OFDM communication signal samples for producing a plurality of modulated tones for each frequency/time slot combination associated with the voice traffic channel;
a demodulator, said demodulator operative to demodulate the plurality of modulated tones for each frequency/time slot combination associated with the voice traffic channel for producing voice data of the voice communication call;
said receiver front end being further operative to receive RF OFDM communication signals over a data traffic channel, the data traffic channel identifiable by a unique frequency/time slot combination;
said FFT processor being further operative to apply and FFT to the RF OFDM communication signal samples for producing a plurality of modulated tones for each frequency/time slot combination associated with the data traffic channel;
said demodulator being further operative to demodulate the plurality of modulated tones for each frequency/time slot combination associated with the data traffic channel for producing the high speed data in addressed data packets; and
a processor, said processor operate to compare a destination address of the addressed data packet with a predetermined address, to accept the addressed data packet if a match exists between the destination address and the predetermined address, and to discard the addressed data packet if the destination address and the predetermined address do not match.

20. A wireless receiver, comprising:
a receiver front end, said receiver front end operative to receive RF OFDM communication signals over a voice traffic channel that is dedicated to a voice communication call, the voice traffic channel identifiable by a unique frequency/time slot combination;
a radio frequency (RF) downconverter, said RF downconverter operative to downconvert the RF OFDM communication signals for producing downconverted OFDM communication signals;
an analog-to-digital converter (ADC), sand ADC operative to convert the downconverted OFDM communication signals into OFDM communication signal samples;
a Fast Fourier Transform (FFT) processor, said FFT processor operative to apply and FFT to the OFDM communication signal samples for producing a plurality of modulated tones for each frequency/time slot combination associated with the voice traffic channel; and
a demodulator, said demodulator operative to demodulate the plurality of modulated tones for each frequency/time slot combination associated with the voice traffic channel for producing voice data of the voice communication call, said demodulator being further operative for producing encoded and compressed data for each one of the plurality of modulated tones, said demodulator comprising a 16-Quadrature Amplitude Modulated (QAM)-based demodulator;
a decoder, said decoder operative to decode the encoded and compressed data for producing compressed data, said decoder comprising a Reed-Solomon decoder; and
a decompressor, said decompressor operative to decompress the compressed data for producing the voice data, said decompressor comprising a Code Excited Linear Predictive (CELP) decompressor.

21. A wireless transmitter, comprising:
a modulator, said modulator operative to modulate a plurality of tones with voice data of a voice communication call for each frequency/time slot combination associated with a voice traffic channel that is assigned to the voice communication call;
an Inverse Fast Fourier Transform (IFFT) processor, said IFFT processor operative to apply an IFFT to the plurality of modulated tones for each frequency/time slot combination associated with the voice traffic channel for producing Orthogonal Frequency Division Multiplexed (OFDM) communication signals samples;
a digital-to-analog converter (DAC), said DAC operative to convert the OFDM communication signal samples into OFDM communication signals;
a radio frequency (RF) upconverter, said RF upconverter operative to upconvert the OFDM communication signals for producing radio frequency (RF) OFDM communication signals; and
a transmitter front end, said transmitter front end operative to transmit the RF OFDM communication signals over the voice traffic channel
said modulator being further operative to modulate a plurality of tones with high speed data for each frequency/time slot combination associated with a traffic channel, the high speed data being carried in addressed data packets;
said IFFT processor being further operative to apply the IFFT to the plurality of modulated tones for each frequency/time slot combination associated with the data traffic channel for producing OFDM communication signals; and
said transmitter front end being further operative to transmit the RF OFDM communication signals over the data traffic channel.

22. The wireless transmitter according to claim 21, further comprising:
    said modulator comprising a phase and amplitude modulator.
23. The wireless transmitter according to claim 21, further comprising:
    a vocoder, said vocoder operative to compress the voice data for producing compressed voice data;
    a block encoder, said block encoder operative to encode the compressed voice data for producing encoded and compressed voice data; and
    said modulator being further operative to modulate a phase and amplitude of each one of the plurality of tones with encoded and compressed voice data.
24. A wireless transmitter, comprising:
    a modulator, said modulator operative to modulate a plurality of tones with voice data of a voice communication call for each frequency/time slot combination associated with a voice traffic channel that is assigned to the voice communication call;
    an Inverse Fast Fourier Transform (IFFT) processor, said IFFT processor operative to apply an IFFT to the plurality of modulated tones for each frequency/time slot combination associated with the voice traffic channel for producing Orthogonal Frequency Division Multiplexed (OFDM) communication signals samples;
    a digital-to-analog converter (DAC), said DAC operative to convert the OFDM communication signal samples into OFDM communication signals;
    a radio frequency (RF) upconverter, said RF upconverter operative to upconvert the OFDM communication signals for producing radio frequency (RF) OFDM communication signals; and
    a transmitter front end, said transmitter front end operative to transmit the RF OFDM communication signals over the voice traffic channel
    a vocoder, said vocoder operative to compress the voice data for producing compressed voice data;
    a block encoder, said block encoder operative to encode the compressed voice data for producing encoded and compressed voice data; and
    said modulator being further operative to modulate a phase and amplitude of each one of the plurality of tones with encoded and compressed voice data, and said modulator comprising a 16-Quadrature Amplitude Modulation (QAM) modulator;
    said block encoder comprising a Reed-Solomon block coder; and
    said vocoder comprising a Code Excited Linear Predictive (CELP) vocoder.

* * * * *